United States Patent [19]

Utagawa

[11] Patent Number: 4,561,749
[45] Date of Patent: Dec. 31, 1985

[54] FOCUS DETECTION APPARATUS

[75] Inventor: Ken Utagawa, Kawasaki, Japan

[73] Assignee: Nippon Kogaku K.K., Tokyo, Japan

[21] Appl. No.: 575,154

[22] Filed: Jan. 30, 1984

[30] Foreign Application Priority Data

| Feb. 2, 1983 | [JP] | Japan | 58-15887 |
| Mar. 3, 1983 | [JP] | Japan | 58-35017 |
| May 9, 1983 | [JP] | Japan | 58-79414 |
| Aug. 11, 1983 | [JP] | Japan | 58-147142 |
| Sep. 16, 1983 | [JP] | Japan | 58-170808 |

[51] Int. Cl.$^4$ .............................................. C03B 3/00
[52] U.S. Cl. ..................................... 354/406; 250/204
[58] Field of Search .............................. 354/402–409; 250/201, 201 PF, 201 AF, 204

[56]  References Cited
U.S. PATENT DOCUMENTS

| 4,203,031 | 5/1980 | Kamachi et al. | 250/204 X |
| 4,428,652 | 1/1984 | Sakai et al. | 354/407 |
| 4,470,676 | 9/1984 | Kinoshita et al. | 354/406 |

FOREIGN PATENT DOCUMENTS 2003692 3/1979 United Kingdom ................ 250/204

Primary Examiner—William B. Perkey
Attorney, Agent, or Firm—Shapiro and Shapiro

[57]  ABSTRACT

A focus detection apparatus has a pair of photoelectric element arrays, a plurality of filters having different MTF characteristics, and an operation unit. A filter is selected from the plurality of filters in accordance with an object or a focusing state. The selected filter filters the data from the photoelectric element arrays, and the operation unit calculates a focus detection signal based on the filtered data.

58 Claims, 166 Drawing Figures

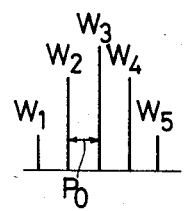
FIG. 13A
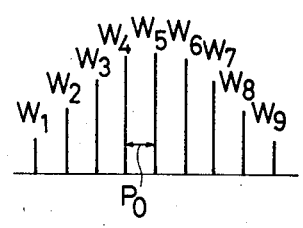
FIG. 13B
FIG. 13C   FIG. 13D
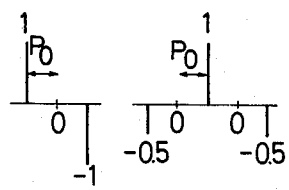
FIG. 13E   FIG. 13F
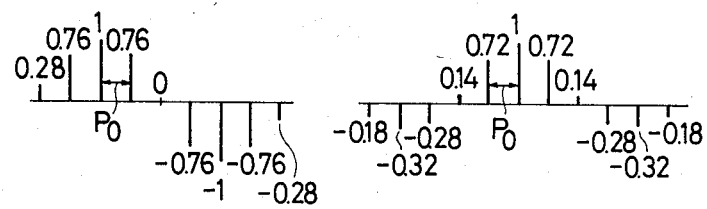
FIG. 13G
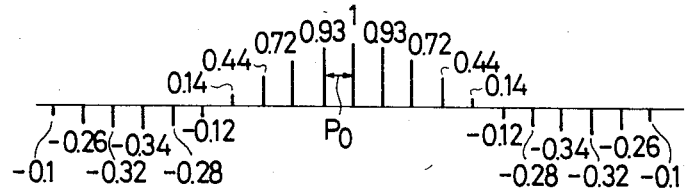

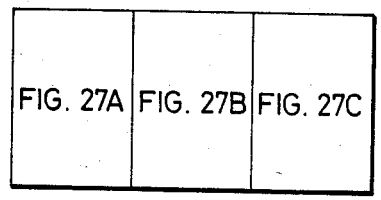
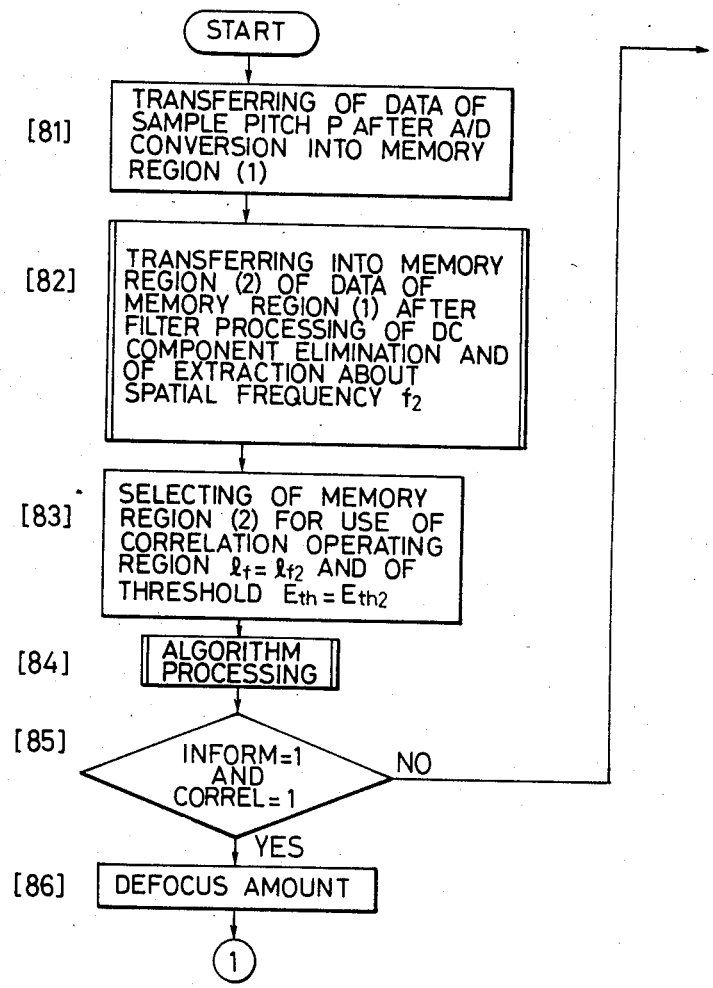

α = 1
β = -0.6

$f_N/2$  $f_N(\frac{1}{2P})$

α = 1
β = -1

$f_N$

α = 1
β = -1.4

$f_N$

α = 1
β = 0

$f_N$

α = 1
β = 1

$f_N$

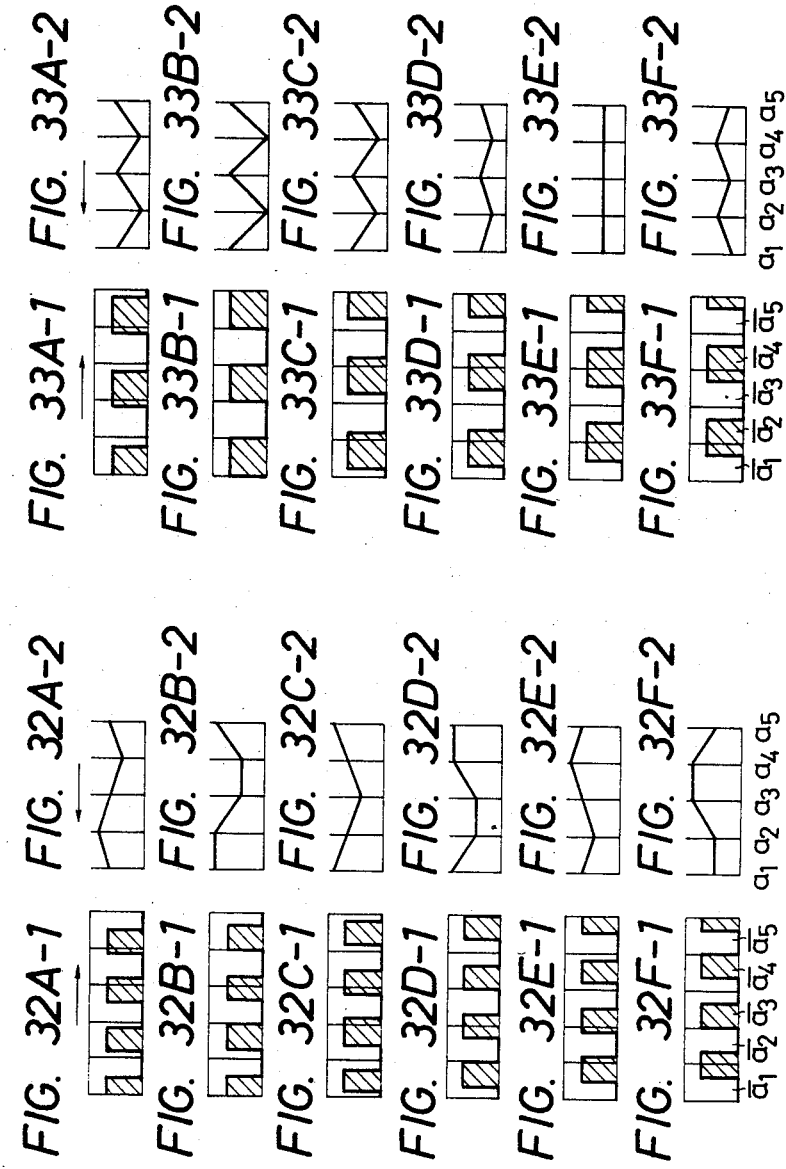

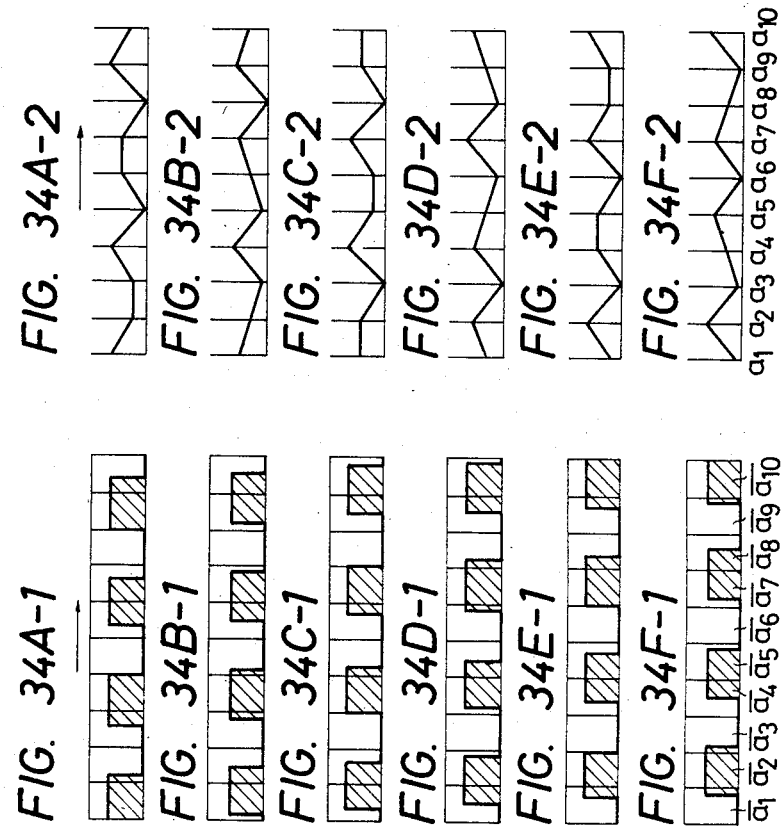

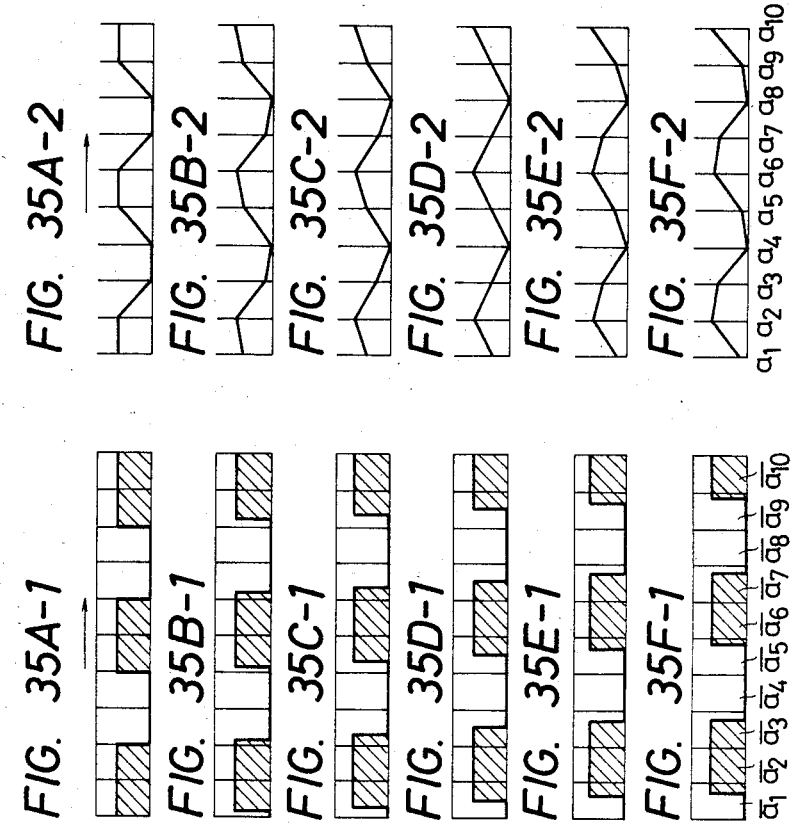

FOCUS DETECTION APPARATUS

BACKGROUND OF THE INVENTION

1. Field of the Invention

The present invention relates to an apparatus for photoelectrically detecting an optical image. More particularly, the present invention relates to a measuring apparatus for photoelectrically detecting an optical image of an object to be measured and detecting a focusing state of an imaging optical system or a distance to the object to be measured.

2. Description of the Prior Art

Conventional focus detection apparatus for single lens reflex cameras are roughly classified into relative displacement detection systems and sharpness detection systems. In a relative displacement detection system, two images of substantially the same portion of an object to be photographed are formed on a pair of photoelectric element array, in each of which a number of photoelectric elements are arrayed, by light rays passed through different regions of a pupil of a phototaking lens. Photoelectric outputs from the photoelectric element arrays are used for operations to detect a relative displacement of the optical images on the photoelectric element arrays. Focus detection is performed based on the detection result obtained. On the other hand, in a sharpness detection system, images of an object to be photographed formed by a phototaking lens are directed onto pair of photoelectric element arrays which are arranged before and after a predetermined focal plane of the phototaking lens. Photoelectric outputs from the photoelectric element arrays are used for performing operations to detect sharpness of the image of the object and to thereby perform focus detection. The operations performed on the photoelectric outputs involves the spatial frequency components in a given spatial frequency band of the image of the object. Low spatial frequency components remain in the image of the object, that is, in the photoelectric electric outputs, even if the phototaking lens is considerably spaced apart from the in-focus position and the object image is blurred accordingly. Therefore, using only the low-order spatial frequency components for the operations, a front-focus or a rear-focus (a front-focus or a rear-focus state indicates a state wherein an object image is formed in front of or behind the predetermined focal plane) can be discriminated even in the case wherein a defocus amount (the defocus amount is the amount of displacement between the predetermined focal plane of an imaging optical system and an object image along the direction of the optical axis) is large. However, focus detection using low spatial frequency components is adversely affected by various electrical or optical errors, and the in-focus position itself cannot be determined with high accuracy. On the other hand, if the spatial frequency components to be subjected to operations are relatively high, the detection result is less adversely affected by such errors and a correct defocus amount can be obtained if the object image is located near the predetermined focal plane. That is, high-precision focus detection can be performed. However, when the phototaking lens is considerably spaced apart from the in-focus position, high spatial frequency components of an object image decreases significantly. Then, precision of focus detection is significantly lowered, and discrimination between a front-focus and a rear-focus cannot even be performed in some cases. The relative displacement detection system has another disadvantage in that if the operations are performed using only high spatial frequency components, an in-focus signal (to be referred to as a pseudo in-focus signal hereinafter) may be generated even if the phototaking lens is at some position distant from the true in-focus position. If the operations are performed using photoelectric outputs in which high spatial frequency components are not separated from low spatial frequency components, the disadvantages involved in operations using either one of the high- and low-order spatial frequency components are increased and the advantages obtained in operations using the other of the high and low spatial frequency components are impaired.

More particularly, focus detection is roughly classified into (1) correct calculation of a defocus amount when a phototaking lens is near a in-focus position, and (2) approximate calculation of a defocus amount or discrimination between a front-focus and a rear-focus when the phototaking lens is significantly spaced apart from the in-focus position. Ideal focus detection can be performed using mainly high spatial frequency components for the former (1) and using low spatial frequency components for the latter (2). This also applies to a sharpness detection system. There are cases wherein an object itself contains a large amount of high spatial frequency components and only a small amount of low spatial frequency components, and vice versa. It has been impossible to perform high-precision detection for all of such various types of objects.

SUMMARY OF THE INVENTION

It is an object of the present invention to provide a measuring apparatus which is capable of measuring with high precision a focusing state or a distance to an object to be measured from a phototaking lens.

BRIEF DESCRIPTION OF THE DRAWINGS

FIGS. 13A to 13G are block diagrams showing the weighting coefficients of the filter means;

FIG. 17A is a graph showing the MTF characteristics of a photoelectric element array, FIGS. 17B-1, 17C-1, 17D-1, 17E-1 and 17F-1 are graphs showing the MTF characteristics of filters, respectively, and FIGS. 17B-2, 17C-2, 17C-3, 17D-2, 17D-3, 17E-2, 17E-3, 17F-2, 17F-3 and 17F-4 show weighting coefficients, respectively;

FIGS. 23 to 27, 27A, 27B, and 27C are flow charts of the present invention wherein the displacement operation section shown in FIG. 20 is used;

FIGS. 31A-1 to 31E-1 and FIGS. 31A-2 to 31E-2 respectively show the synthetic weighting coefficient series and the MTF characteristics;

FIGS. 32A-1 to 32F-1 are representations showing a periodic lattice image on the photoelectric element array;

FIGS. 32A-2 to 32F-2 are graphs respectively showing photoelectric output patterns corresponding to FIGS. 32A-1 to 32F-1;

FIGS. 33A-1 to 33F-1, FIGS. 34A-1 to 34F-1 and FIGS. 35A-1 to 35F-1 are graphs similar to FIGS. 32A-1 to 32F-1, respectively;

FIGS. 33A-2 to 33F-2, FIGS. 34A-2 to 34F-2, and FIGS. 35A-2 to 35F-2 are graphs similar to FIGS. 32A-2 to 32F-2, respectively;

FIGS. 42A to 45A and FIGS. 42B to 45B are graphs showing the MTF characteristics and views showing a weighting coefficient series which gives such MTF characteristics, respectively; and FIGS. 46A to 49A, FIGS. 46B to 49B and FIGS. 46C to 48C are graphs showing the MTF characteristics and a weighting coefficient series which gives such MTF characteristics, respectively.

DETAILED DESCRIPTION OF THE PREFERRED EMBODIMENTS

The preferred embodiments of a focus detection apparatus of the present invention will now be described with reference to the accompanying drawings.

Figure 1:
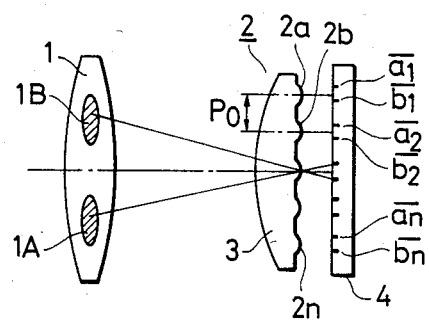
FIG. 1 is a representation showing an optical system in a first embodiment of a focus detection apparatus of the present invention.
Figure 2:
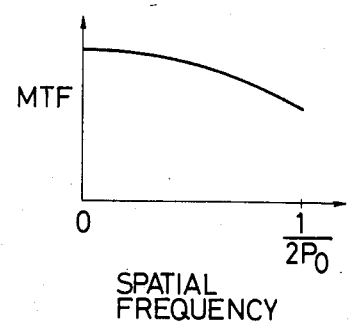
FIG. 2 is a graph showing the MTF characteristics of a small lens array shown in FIG. 1.

Referring to FIG. 1 showing a focus detection optical system, a small lens array 2 consisting of a number of small lenses $2a, 2b, \ldots, 2n$ which are linearly aligned is arranged on the predetermined focal plane of an imaging optical system 1 such as a phototaking lens to be subjected to focus detection. The small lens array 2 is at the flat side of a plane-convex lens 3. First and second object images are formed on the small lens array 2 by light rays which have passed through regions 1A and 1B, respectively, on the pupil of the imaging optical system 1. The displacement amount between the object images in a direction perpendicular to the optical axis corresponds to the defocus amount of the imaging optical system 1. This displacement amount may also be interpreted to represent a distance from the detection apparatus to the object when the position of the imaging optical system is considered. A photoelectric unit 4 for photoelectrically detecting the displacement between the two images is arranged immediately behind the small lens array 2 and has a pair of photoelectric element groups $(\overline{a1}, \overline{b1}), (\overline{a2}, \overline{b2}), \ldots, (\overline{an}, \overline{bn})$, which are respectively opposed to the small lenses $2a$ to $2n$. Of the pair of arrays, the upper, first photoelectric element array $\overline{a1}, \overline{a2}, \ldots,$ an subjects the first object image to photoelectric conversion, and the lower, second photoelectric element array $\overline{b1}, \overline{b2}, \ldots,$ bn subjects the second object image to photoelectric conversion. When photoelectric outputs from the photoelectric elements $\overline{a1}$ to an and $\overline{b1}$ to $\overline{bn}$ are respectively designated by a1 to an and b1 to bn, the photoelectric device 4 produces these photoelectric outputs in the order of a1, b1, a2, b2, ..., an and bn. Such a focus detection system is disclosed in detail in U.S. Pat. No. 4,185,191. Note that photoelectric outputs used herein include outputs which are obtained by linear amplification or logarithmic amplification of the outputs from the photoelectric elements. As shown in FIG. 2, the MTF (Modulation Transfer Function) characteristics which are determined by the aperture shapes of the small lenses $2a$ to $2n$ of the small lens array 2 have high values within a frequency range between zero frequency and the Nyquist frequency ½Po given as a function of a lens array pitch Po. When it is assumed that the first and second object images contain sufficient amounts of the low spatial frequency components to the high spatial frequency components near the Nyquist frequency, it is seen from the MTF characteristics as described above that the photoelectric outputs contain low to high spatial frequency components.

Figure 3:
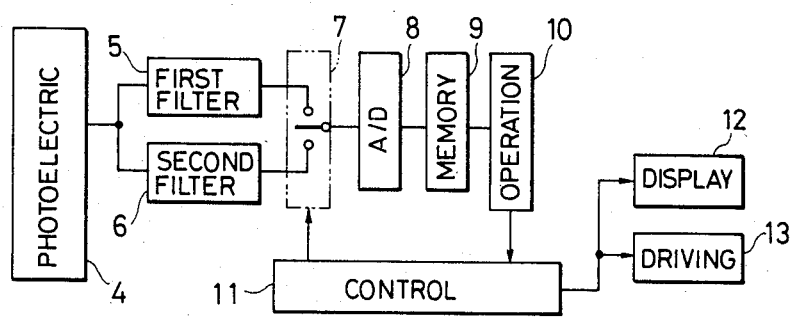
FIG. 3 is a block diagram showing circuitry of the first embodiment.
Figure 4A:
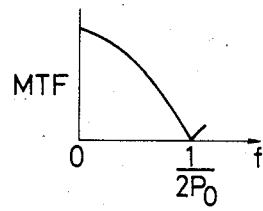
FIG. 4A is a graph showing the MTF characteristics of a first filter means.
Figure 5A:
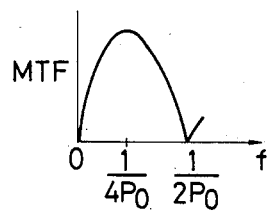
FIGS. 5A, 5B and 5C are block diagrams showing the MTF characteristics of a second filter means and examples of a configuration thereof, respectively.

Referring to FIG. 3, the input terminals of a first filter means 5 and a second filter means 6 are connected to the output terminal of the photoelectric device 4. The first and second filter means 5 and 6 filter the photoelectric outputs a1, b1, a2, b2, ..., an, bn which are time-serially supplied from the photoelectric device 4, to time-serially produce A1, B1, A2, B2, . . . , An, Bn. FIGS. 4A and 5A show the MTF characteristics of the first and second filter means 5 and 6, respectively. As may be apparent from these figures, the MTF of the first filter means 5 is sufficiently high at a low frequency near zero, continuously decreased, and reaches substantially zero at the Nyquist frequency $\frac{1}{2}$Po. The MTF of the second filter means 6 is sufficiently high near a frequency $\frac{1}{4}$Po which is half the Nyquist frequency, continuously decreases toward low and high frequency sides, and reaches substantially zero at zero frequency (D.C. component) and the Nyquist frequency $\frac{1}{2}$Po, respectively. Accordingly, the first filter means 5 serves to suppress the high spatial frequency components in contrast to the low spatial frequency components and passes a large amount of the low spatial frequency components. Conversely, the second filter means 6 suppresses the low spatial frequency components in contrast to the high spatial frequency components and passes a large amount of the high spatial frequency components. A filter selecting means 7 selects one of the outputs from the first and second filter means 5 and 6 and supplies the selected input to a memory means 9 through an A/D converter 8. The memory means 9 has a capacity sufficient to store all the output from the A/D converter 8 which corresponds to the photoelectric outputs a1, b1, a2, b2, . . . , an, bn. In accordance with filtered outputs A1 to An and B1 to Bn stored in the memory means 9, an operation means 10 calculates a focus detection signal Zi representing a relative displacement between the first and second object images on the first and second photoelectric element arrays, and also an information amount signal Di representing the certainty of information used for operations. The signal Zi is proportional to a defocus amount. The sign of the signal Zi represents a front-focus or a rear-focus, and the absolute value of the signal Zi represents the absolute value of the defocus amount. When the signal Di is above a predetermined value Do, it means that the corresponding focus detection signal Zi is reliable. An example of a configuration of such an operation means is disclosed in U.S. Pat. No. 4,333,007. The focus detection signal Zi and the information amount signal Di are supplied to a control means 11. The control means 11 compares the absolute value of the focus detection signal Zi with a predetermined value Zo. If the former is larger than the latter, the control means 11 supplies a first filter means selection signal for selecting the first filter means 5 to the filter selecting means 7. When the former is smaller than the latter, the control means 11 supplies a second filter means selection signal for selecting the second filter means 6 to the filter selecting means 7.

The mode of operation of the system described above will now be described below.

When the imaging optical system 1 forms the first and second object images on the small lens array 2, the first photoelectric element array a1, . . . , an converts an illuminance distribution pattern of the first object image into photoelectric outputs a1 to an, and the second photoelectric element array b1, . . . , bn converts the second object image into photoelectric outputs b1, . . . , bn. The photoelectric device 4 alternately and time-serially produces the photoelectric outputs from the first and second photoelectric element arrays in the order of a1, b1, a2, b2, . . . , an, bn. Such a series of photoelectric outputs is repeatedly produced at a predetermined time interval. When the filter selecting means 7 selects the second filter means 6, the series of photoelectric outputs a1, b1, . . . , an, bn is filtered by the second filter means 6 to be converted into the filtered outputs A1, B1, . . . , An, Bn which are stored in the memory means 9 through the A/D converter 8. On the basis of the stored contents of the memory means 9, the operation means 10 calculates a focus detection signal Zi and an information amount signal Di. Hereinafter, signals Zi; Di when the first and second filter means are selected, respectively, are represented by Zi(1); Di(1), and Zi(2); Di(2). The control means 11 first discriminates if the signal Di(2) has reached the predetermined value Do and if the absolute value $|Zi(2)|$ of the focus detection signal is larger than a predetermined value Zo. When the signal Di(2) is larger than or equal to Do, that is, Di(2)-$\geq$Do and when $|Zi(2)| \leq Zo$, the information is accurate. Then, based on the signal Zi(2), the control means 11 controls a display unit 12 and a driving unit 13 and continues to produce a second filter means selection signal. Then, the display unit 12 displays the focusing state, and the driving unit 13 drives the imaging optical system 1 toward the in-focus position. If the signals Zi(2) and Di(2) do not satisfy the above conditions, the accuracy of the information is low; the first and second object images are significantly blurred, the amount of high spatial frequency components is small, and the amount of low spatial frequency components is large. Accordingly, the display/drive is not performed in accordance with the current information, and the control means 11 supplies a first filter selection signal to the filter selecting means 7. When the filter selecting means 7 accordingly selects the first filter means 5, a series of subsequently produced photoelectric outputs a1, b1, . . . , an, bn, is filtered by the first filter means 5, and the operation means 10 calculates a focus detection signal Zi(1) and an information amount signal Di(1) in the same manner as described above. If Di(1) $\geq$Do, the control means 11 controls the display unit 12 and the driving unit 13 in accordance with the signal Zi(1). When the first filter means 5 is selected, which of the first and second filter means is to be selected next may be determined in accordance with the drive method of the imaging optical system. A case of intermittent driving will be described with reference to a case wherein the imaging optical system 1 is stopped to perform operations for detecting the image displacement as described above, the imaging optical system is driven to move for a distance corresponding to the defocus amount calculated in accordance with these operations, operations for detecting the image displacement are performed again after the imaging optical system has been stopped, and the imaging optical system is driven again. In this case, if the effective signal Zi(1) is obtained after selection of the first filter means 5, the imaging optical system must have been driven in accordance with the operation results in accordance with this signal and the imaging optical system must have been driven near the in-focus position when the image displacement is detected next. Accordingly, it is suitable to select the second filter means 6 next. For this reason, in the case of intermittent driving of the imaging optical system, when the first filter means 5 is selected at one time, it is suitable to select the second filter means 6 next irrespective of the values of the operation results Zi(1) and Di(1).

On the other hand, if driving of the imaging optical system and focus detection are performed simultaneously, when conditions $Di(1) \geqq Do$ and $|Zi(1)| > Zo$ are satisfied, the first filter means continues to be selected next. If, on the other hand, these conditions are not satisfied, the second filter means is selected. More specifically, when the conditions $Di(1) \geqq Do$ and $|Zi(1)| \leqq Zo$ are satisfied, the imaging optical system is near the in-focus position and the images are expected to include a large amount of high spatial frequency components. Therefore, it is better to select the second filter means. When the condition $Di(1) < Do$ is satisfied, depending upon the type of an object, the object may not contain low spatial frequency components and may only contain high spatial frequency components. Then, even if the result obtained with the first filter means indicates deficiency of information [i.e., $Di(1) < Do$], it may be possible to perform detection [$Di(2) \leqq Do$] if the second filter means is used. For this reason, it is suitable to switch to the second filter means in this case. In this manner, the control means 11 controls the filter selecting means 7 to select one of the first and second filter means 5 and 6.

Accordingly, when the imaging optical system is near the in-focus position, the defocus amount is small, and the high spatial frequency components in the first and second object images are large, the second filter means which suppresses the low spatial frequency components is automatically selected. Then, high precision focus detection can be performed based on the high spatial frequency components without being adversely affected by the low spatial frequency components when the optical system is near the in-focus position. On the other hand, if the imaging optical system 1 is significantly spaced apart from the in-focus position, the high spatial frequency components are small, and the low spatial frequency components are large, the first filter means 5 which passes the low spatial frequency components is automatically selected and focus detection is performed based on the low spatial frequency components.

The position of the filter selecting means 7 is not limited to that shown in the figure. For example, the filter selecting means 7 can also be inserted between the output terminal of the photoelectric unit 4 and the input terminals of the first and second filter means 5 and 6. Alternatively, the filter selecting means 7 can also be inserted after the operation means 10. In the latter case, a series of photoelectric outputs is processed by the first and second filter means 5 and 6. Outputs from the first and second filter means 5 and 6 are processed by the operation means 10 to calculate the focus detection signal $Zi(1)$ based on the output from the first filter means 5 and the focus detection signal $Zi(2)$ based on the output from the second filter means 6. Thereafter, the filter selecting means 7 selects one of the signals $Zi(1)$ and $Zi(2)$. In this manner, according to the present invention, the selection between the first and second filter means includes cases wherein one of the outputs from the first and second filter means which is to be supplied to the operation means 10 is selected, and one of the outputs from the operation means 10 which is based on the output from the first filter means and the output from the operation means 10 which is based on the output from the second filter means is selected.

The configurations of the first and second filters 5 and 6 will now be described with reference to FIGS. 4B and 5B.

Figure 4B:
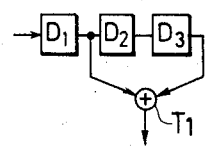
FIGS. 4B and 4C are block diagrams showing examples of a configuration of the first filter means, respectively.

Referring to FIG. 4B, delay circuits D1, D2 and D3 corresponding to one pixel are series-connected, and an adder T1 adds outputs from the delay circuits D1, D2 and D3. When the time-serial photoelectric outputs a1, b1, a2, b2, a3, b3, ..., are sequentially supplied from the photoelectric device 4 to the delay circuits D1 to D3, the adder T1 produces sums (a1+a2), (b1+b2), (a2+a3), ....

Figure 4C:
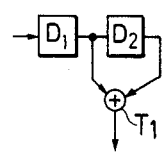
Figure 5B:
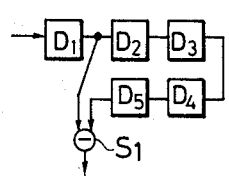
Figure 5C:
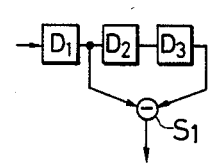

In the configuration as shown in FIG. 5B, differences (a1−a3), (b1−b3), ..., of the outputs from first and fifth delay circuits D1 and D5 among series-connected delay circuits D1 to D5 corresponding to one pixel are calculated by a subtracter S1. When the outputs from the second photoelectric element array are read out after all the outputs from the first photoelectric element array are read out, that is, if the order of the time-serial photoelectric outputs from the photoelectric unit 4 is a1, a2, ..., an, b1, b2, ..., bn, the configurations of the first and second filter means 5 and 6 are as shown in FIGS. 4C and 5C, respectively. It is to be noted that instead of using filter means 5 and 6 which are constituted as hardware, a microcomputer or the like may be used to calculate (a1+a2), (a1−a3), ....

As may be seen from a comparison of FIG. 4A showing the MTF characteristics of the first filter means 5 and FIG. 2 showing the MTF characteristics of the original signal, the first filter means 5 serves to suppress the high spatial frequency components. However, since the basic function of the first filter means 5 is to pass at least the low spatial frequency components, a filter having an infinite frequency passband may be used as the filter means 5. More specifically, the photoelectric outputs may be directly connected to the A/D converter 8 through the filter selecting means 7. In this case, the filter means 5 practically effects no filtering processing. However, in this specification, based upon the assumption that the first filter means has an MTF frequency band which is different from that of the second filter means, an imaginary filter means which effects no filtering processing is also included in the concept of a filter means.

A case will now be described wherein the first filter means is an imaginary filter means as described above and the filtering processing of the second filter means is performed within the operation means 10. In this case, as described above, the photoelectric outputs are directly supplied to the A/D converter 8. The memory means 9 stores the data having information about the spatial frequency band as shown in FIG. 2. The operation means 10 performs operations based on the data stored in the memory means 9 to calculate the focus detection signal $Zi(1)$ and the information amount signal $Di(1)$. If the condition $Zi(1) < Zo$ is satisfied, the operation means 10 calculates every other differential data $A1 = a1 − a3, ..., Ai = ai − a(i+2), ..., B1 = b1 − b3, ... Bj = bj − b(j+2), ...$ to thereby produce the filtered outputs $A1, A2, ..., A(n−1), B1, B2, ..., B(n−1)$. These filtered outputs are subjected to operations again to calculate the focus detection signal $Zi(2)$ and the information amount signal $Di(2)$. When $Zi(1) \geqq Zo$, the control signal 11 controls the display unit 12 and the driving unit 13 based on the focus detection signal $Zi(1)$. On the other hand, when $Zi(1) < Zo$, the control means 11 controls the display unit 12 and the driving unit 13 based on the focus detection signal $Zi(2)$. For the next series of photoelectric outputs, the operation means 10 calculates the signals $Zi(1)$ and $Di(1)$ first in the manner as described above. When the signal $Zi(1)$ is smaller than the predetermined value $Zo$, the filtering processing is performed to extract the high spatial frequency components, and the signals $Z_i(2)$ and $D_i(2)$ are calculated.

As may be seen from the above description, various methods of selecting the filter means can be adopted. For example, as in the embodiment shown in FIG. 3, one of the first and second filter means is selected for each series of photoelectric outputs in accordance with the magnitudes of the signals $Z_i$ and $D_i$. Alternatively, the second filter means can always be selected after the first filter means is selected. Still alternatively, as in the last case described above, the first filter means (the first filter means is an imaginary filter in the above case) is selected for each series of photoelectric outputs. The signal $Z_i(1)$ obtained with the thus selected first filter means determines whether or not the second filter means is to be selected. Irrespective of which one of these methods is selected, if the imaging optical system is near the in-focus position and a sufficient amount of high spatial frequency components is present, the display and driving units must be driven in accordance with the focus detection signal $Z_i(2)$ which is obtained with the filtered outputs from the second filter means.

Figure 6A:
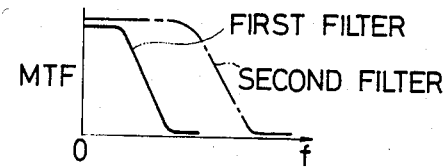
FIGS. 6A, 6B and 6C are graphs showing the MTF characteristics of the first and second filter means.
Figure 6B:
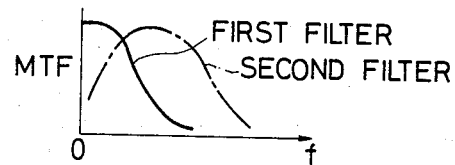
Figure 6C:
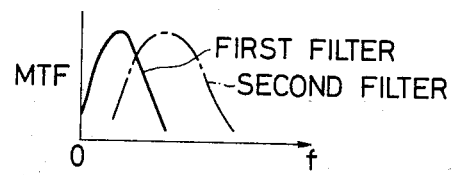

The MTF characteristics of the first and second filter means 5 and 6 are preferably selected such that the center frequency of the passband of the second filter means is set to be higher than that of the first filter means. The MTF characteristics of the first and second filter means 5 and 6 which satisfy this condition may be those of the first embodiment shown in FIGS. 4A and 5A or those shown in FIGS. 6A to 6C. The MTF characteristics indicated by the solid curve in FIG. 6A are set to suppress high spatial frequency components and to pass relatively low spatial frequency components. The MTF characteristics indicated by the alternate long and short dashed line are set to pass high spatial frequency components. In this manner, since the first filter means sufficiently suppresses the high spatial frequency components, even if the object contains a relatively large amount of high spatial frequency components as compared to that of low spatial frequency components, a pseudo in-focus signal may not be generated when the first filter means is selected. The MTF characteristics of the first and second filter means shown in FIG. 6B resemble those shown in FIGS. 4A and 5A and differ therefrom in that the high spatial frequency components are further suppressed as compared to FIG. 4A. Then, the generation of a pseudo in-focus signal can be prevented as in the case of FIG. 6A. In this case, when the imaging optical system is near the in-focus position, the second filter means having the MTF characteristics as shown in FIG. 6B is used so as to eliminate the low spatial frequency components and to perform focus detection based on a signal mainly consisting of the high spatial frequency components. Accordingly, the focus detection precision is high. When the defocus amount is relatively large, the first filter means having the MTF characteristics as shown in FIG. 6B is used to eliminate the high spatial frequency components which may otherwise result in generation of a pseudo in-focus signal. Thus, defocus amount is detected based only on the low spatial frequency components. For this reason, even if the imaging optical system is significantly spaced apart from the in-focus position, a pseudo in-focus signal may not be generated and a front- or rear-focus state may be detected. In the MTF characteristics of the first filter means shown in FIG. 6C, of the low spatial frequency components, a zero frequency component, that is, a D.C. component is considerably suppressed and a peak value appears at a frequency slightly higher than the zero frequency. The MTF characteristics of the second filter means shown in FIG. 6C are set to have a peak value at a higher frequency than the first filter means. When both the first and second filter means have the function of suppressing the D.C. component, the following advantage is obtained. In some cases, there are differences between the sensitivity of the first photoelectric element array elements $\overline{a1}, \ldots, \overline{an}$, the D.C. component of the photoelectric output therefrom, and those of the second photoelectric element array elements $\overline{b1}, \ldots, \overline{bn}$. Such differences can lead to a degradation in the focus detection precision. However, when the D.C. component is suppressed, such an adverse effect of the differences can be eliminated. Such differences originate from the differences in the sensitivities of the arrays or differences in the temperature drift amounts of the arrays when the first and second photoelectric element arrays are formed on separate chips.

In the above description, the passband of the MTF characteristics mainly involves the high spatial frequencies or involves the low spatial frequencies. However, the upper limit of the effective band is the Nyquist frequency determined by the sampling pitch of the data to be subjected to operations. Accordingly, the high or low spatial frequency components described above must fall within the frequency range below the Nyquist frequency.

The second embodiment of the present invention will now be described.

Figure 7:
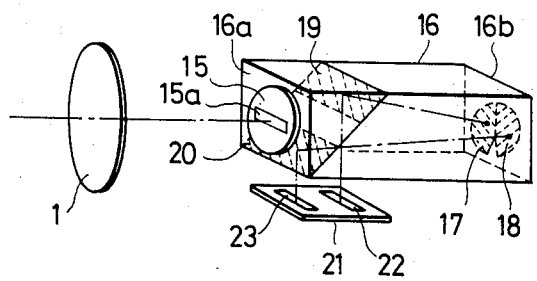
FIG. 7 is a perspective view showing an optical system of a second embodiment of the present invention.

Referring to FIG. 7, a field lens 15 is arranged near the predetermined focal plane of an imaging optical system such as a phototaking lens. The field lens 15 has a rectangular light-transmitting region 15a at its center and a light-shielding region surrounding it. A substantially rectangular transparent block 16 consists of a material having a high refractive index such as glass or plastic. The first lens 15 is adhered on one end face 16a of the block 16. A pair of concave mirrors 17 and 18 are inclined in opposite directions and are arranged at the other end face 16b of the block 16. A pair of mirrors 19 and 20 are inclined at an angle of about 45° and are disposed at a certain distance in the portion of the block 16 which is between the one and the other ends 16a and 16b. A photoelectric unit 21 is arranged below the transparent block 16. Photoelectric element arrays 22 and 23 are formed in the photoelectric unit 21 below the mirrors 19 and 20, respectively.

Light rays which have passed through the imaging optical system 1 pass through the light-transmitting region 15a of the field lens 15, enter into the block 16, and become incident on the concave mirrors 17 and 18 through a gap between the mirrors 19 and 20. The concave mirror 17 reflects the incident light toward the mirror 19, while the concave mirror 18 reflects the incident light toward the mirror 20. The light reaches the photoelectric element arrays 22 and 23 through the mirrors 19 and 20, respectively. In this manner, a pair of object images for the object are formed on the arrays 22 and 23, respectively.

Circuitry for processing the photoelectric outputs from the photoelectric device 21 will now be described with reference to FIG. 8.

Figure 8:
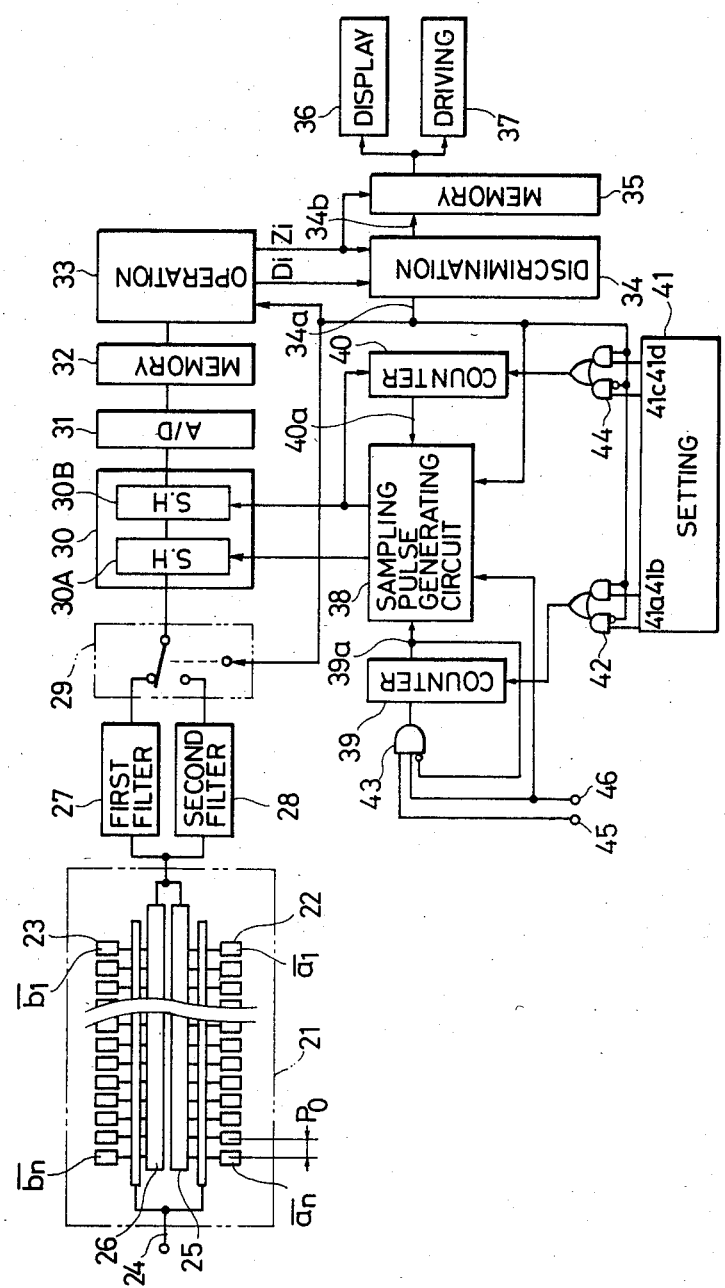
FIG. 8 is a block diagram showing circuitry of the second embodiment.
Figure 9A:
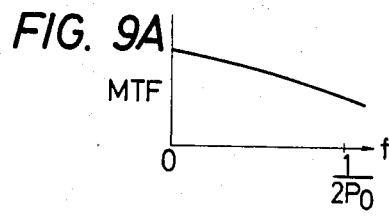
FIG. 9A is a graph showing the MTF characteristics of a photoelectric element array.
Figure 9D:
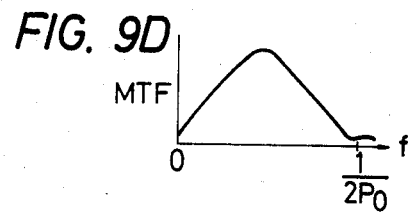
FIGS. 9B to 9F are graphs showing the MTF characteristics of a filter means.
Figure 9B:
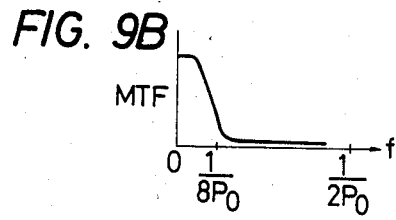
Figure 9E:
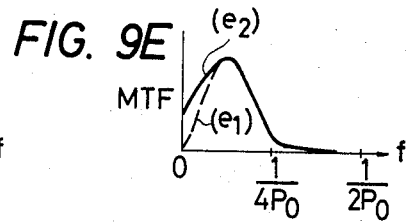
Figure 9C:
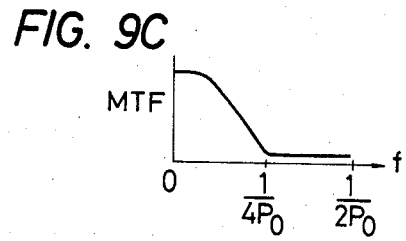

Referring to FIG. 8, the photoelectric device 21 comprises a CCD image sensor which includes the first photoelectric element array 22, the second photoelectric element array 23, a transfer gate 24, and shift registers 25 and 26. The photoelectric device 21 may also have other parts such as amplifiers for linearly or logarithmically amplifying the photoelectric outputs. It is to be noted that the photoelectric device 21 may alternatively comprise a MOS image sensor or the like. Photoelectric elements $\overline{a1}, \ldots, \overline{an}$ constituting the first photoelectric element array 22 are arrayed in close succession at a pitch Po. The second photoelectric element array 23 has the same configuration. Photoelectric outputs a1, ..., an from the first photoelectric element array 22 and photoelectric outputs b1, ..., bn from the second photoelectric element array 23 are alternately produced as in the case of the first embodiment. A series of photoelectric outputs a1, b1, a2, b2, ..., an, bn is repeatedly produced at a predetermined period. The first and second photoelectric element arrays 22 and 23 as described above have the MTF characteristics as shown in FIG. 9A. The input terminals of first and second filter means 27 and 28 are connected to the output terminal of the photoelectric device 21. The first filter means 27 has the MTF characteristics as shown in FIG. 9B wherein the low spatial frequency components are passed while the high spatial frequency components near the frequency 1/8Po are sufficiently suppressed. Meanwhile, the second filter means 28 has the MTF characteristics as shown in FIG. 9C wherein the low spatial frequency components are passed while the high spatial frequency components near a frequency 1/4Po are sufficiently suppressed. Thus, the second filter means 28 is determined to pass spatial frequency components higher than those passed by the first filter means 27. A filter selecting means 29 used in the second embodiment is of the same configuration as that used in the first embodiment; it selects one of the outputs from the first and second filter means 27 and 28 and supplies the selected output to a sample & hold means 30. The sample & hold means 30 comprises a first sample & hold circuit 30A and a second sample & hold circuit 30B connected in series with each other. An A/D converter 31 performs the A/D conversion of the output from the sample & hold circuit 30B. A memory 32 and an operation means 33 are of the same configuration as those of the first embodiment described above. A discrimination means 34 receives a focus detection signal Zi and an information amount signal Di from the operation means 33. If an information amount signal Di(1) or Di(2) which is obtained when the first or second filter means 27 or 28 is selected is smaller than a predetermined value Do(1) or Do(2), respectively, the discrimination means 34 selectively produces, at an output terminal 34a, first and second filter selection signals irrespective of the focus detection signal Zi. More specifically, if the filter selecting means 29 is currently selecting the first filter means 27, the discrimination means 34 produces a second filter selection signal (H level signal) for selecting the second filter means 28. On the other hand, if the filter selecting means 29 is currently selecting the second filter means 28, the discrimination means 34 produces a first filter selection signal (L level signal) for selecting the first filter means 27. If the information amount signal Di(1) or Di(2) is equal to or larger than a corresponding predetermined value Do(1) or Do(2), respectively, and the absolute value of the focus detection signal Zi(1) or Zi(2) is larger than the corresponding predetermined value Zo(1) or Zo(2), respectively, the discrimination means 34 produces the first filter selection signal at an output terminal 34a. When the absolute value of the focus detection signal Zi(1) or Zi(2) is smaller than the corresponding predetermined value Zo(1) or Zo(2), respectively, the discrimination means 34 produces the second filter selection signal at the output terminal 34a. When the information amount signal Di(1) or Di(2) is larger than the corresponding predetermined value Do(1) or Do(2), it produces a memory update signal at the output terminal 34b. In response to the memory update signal, a memory 35 stores the current focus detection signal Zi. In accordance with the focus detection signal Zi stored in the memory 35, a display unit 36 displays the focusing state and a driving unit 37 drives the imaging optical system 1 toward the in-focus position. A sampling pulse generating circuit 38 is connected to the output terminal 34a of the discrimination means 34 to supply a sampling pulse for starting sample & hold of the sample & hold circuits 30A and 30B. The sampling pulse period or sampling pitch changes in accordance with the output from the discrimination means 34. When the discrimination means 34 produces a first filter selection signal, the sampling period is larger than (twice in this embodiment) that of a case wherein the discrimination means 34 produces a second filter selection signal. Upon reception of a start signal or an H level signal from an output terminal 39a of a first counter 39, the sampling pulse generating circuit 39 starts generating sampling pulses. In response to an end signal or an H level signal from an output terminal 40a of a second counter 40, the sampling pulse generating circuit 38 stops generating the sampling pulses. The first counter 39 is a presettable counter; a preset value is set in the first counter 39 from a setting circuit 41 through a gate means 42. The first counter 39 down-counts the pulses from an AND gate 43. When the count of the first counter 39 becomes zero, it produces a start signal or an H level signal. The second counter 40 is also a presettable counter; a preset value is set in the second counter 40 from the setting circuit 41 through a gate means 44. The second counter 40 down-counts the sampling pulses supplied to the sample & hold circuit 30B. When the count of the second counter 40 reaches zero, the counter 40 supplies an end signal or an H level signal. In the setting circuit 40, there are preset the first preset value for the first counter and the first preset value for the second counter which are used when the first filter means 27 is selected, and the second preset value for the first counter and the second preset value for the second counter which are used when the second filter means 28 is selected. The first-counter first preset value and the second-counter first preset value are produced at output terminals 41a and 41c, respectively. The first-counter second preset value and the second-counter second preset value are produced from output terminals 41b and 41d, respectively. In this embodiment, the first preset value which appears at the output terminal 41a is set to be smaller than the second preset value which appears at the output terminal 41b. The first preset value which appears at the output terminal 41c is set to be equal to the second preset value which appears at the output terminal 41d. An input terminal 45 receives an H level signal from a sequence controller (not shown) in synchronism with start of transfer of a series of photoelectric outputs a1, b1, ..., an, bn from the photoelectric unit 21. This signal is reset at L level at a suitable timing and has a duration from the end of sample & hold of the data to setting of the next preset values in the presettable counters 39 and 40. An input terminal 46 receives a clock synchronous with a transfer clock for the series of the photoelectric outputs described above.

The mode of operation will now be described.

Figure 10A:
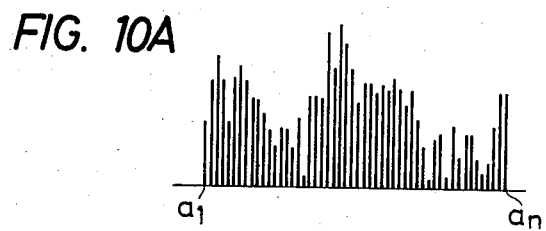
FIGS. 10A, 10B and 10C show waveforms of a photoelectric output, an output from the first filter means, and an output from the second filter means.
Figure 10B:
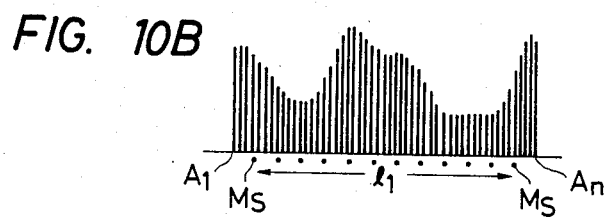
Figures 11A, 11B, 11C, 11D, 11E:
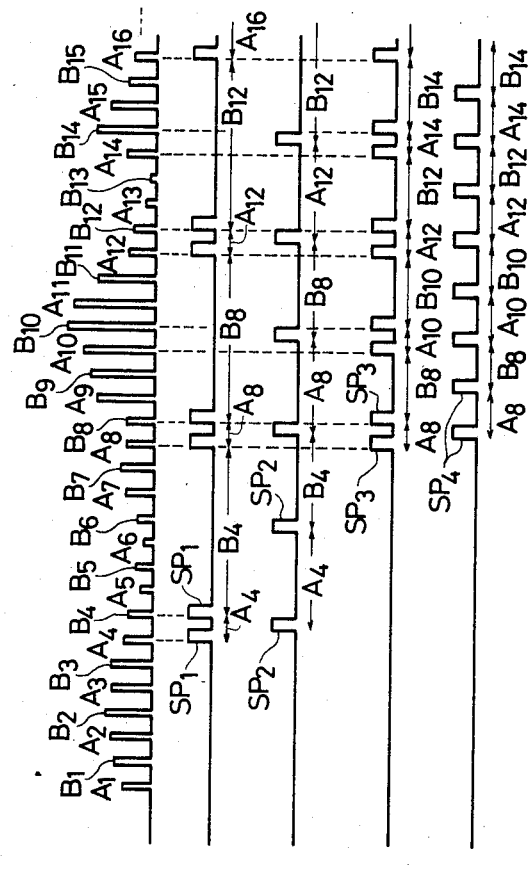
FIGS. 11A, 11B, 11C, 11D and 11E are timing charts showing outputs from the filter means and a sampling pulse.

Assume that the discrimination means 34 produces an L level signal as first filter selection signal at the output terminal 34a. In response to this selection signal, the filter selecting means 29 selects the first filter means 27. The gate means 42 and 44 respectively pass the first-counter preset value and the second-counter preset value from the output terminals 41a and 41c, respectively, of the setting circuit 41 to set these preset values in the respective counters 39 and 40. Thereafter, in response to a signal from the sequence controller (not shown), a series of photoelectric outputs a1, b1, a2, b2, ..., an, bn is read out from the photoelectric unit 21. Of these photoelectric outputs, the photoelectric outputs a1, a2, ..., an from the first photoelectric element array 22 are shown in FIG. 10A. The series of photoelectric outputs a1, b1, ..., an, bn is filtered by the first filter means 27 and converted into filtered outputs A1, B1, ..., An, Bn as shown in FIG. 11A. Of the filtered outputs A1, B1, An, Bn, those associated with the first photoelectric element array (which will be described as the a series hereinafter) A1, ..., An are shown in FIG. 10B. It is apparent from a comparison of FIGS. 10A and 10B that good suppression of the high spatial frequency components is obtained by the first filter means 27. Meanwhile since an H level signal is supplied to the input terminal 45 synchronously with readout of the photoelectric outputs from the photoelectric unit 21, transfer clocks from the input terminal 46 pass through an AND gate 43. The first counter 39 down-counts the transfer clocks from the preset value therein. When the number of input clocks reaches the preset value (when the count reaches zero), the first counter 39 produces an H level signal as a start signal. The start signal is supplied to the sampling pulse generating circuit 38, and is inverted and supplied to the AND gate 43 to close its gate. In response to the start signal, the sampling pulse generating circuit 38 generates first and second sampling pulses SP1 and SP2 as shown in FIGS. 11B and 11C, respectively, to the first and second sample & hold circuits 30A and 30B, respectively. In response to the pulse SP1, the first sample & hold circuit 30A samples outputs A4, B4, A8, B8, A12, B12, ... from the filtered outputs A1, B1, ..., An, Bn. The first sample & hold circuit 30A holds the a series outputs A4, A8, ... for a short period of time and b series outputs B4, B8, ... associated with the second photoelectric element array for a long period of time, as shown by a range indicated by arrows in FIG. 11B. In order to render the hold times of the two series of outputs equal to each other, the second sample & hold circuit 30B samples and holds the output from the first sample & hold circuit 30A in response to the second sampling pulse SP2 as shown in FIG. 11C. The second counter 40 counts the second sampling pulses SP2. When the number of the second sampling pulses SP2 received reaches the first preset value, the second counter 40 supplies an end signal to stop generation of the first and second sampling pulses SP1 and SP2.

Referring to FIG. 10B, of the a series filtered outputs A1, ..., An, sampled, filtered outputs A4, A8, A12, ... are indicated by marks Ms thereunder. As may be seen from this figure, a distribution range l2 (to be referred to as a sampling region hereinafter) of the sampled, filtered outputs shares most of the range of the filtered outputs A1 ..., An.

The A/D converter 31 performs A/D conversion of the output from the second sample & hold circuit 30B and supplies the digital signals obtained to the memory 32. The second sample & hold circuit 30B is incorporated herein for the following reason. If the output from the second sample & hold circuit 30A is directly A/D converted, the holding time by the first sample & hold circuit 30A of the outputs B4, B8, ... is shorter than that of the outputs A4, A8, .... Accordingly, an expensive high-speed A/D converter must be used as the converter 31 such that the A/D conversion can be completed within the shorter period of time of the two holding times. Even if such a high-speed A/D converter is used, the effect of high-speed conversion is not important in the case of A/D conversion of the outputs B4, B8, ... which are held for a long period of time. However, this problem is resolved when the second sample & hold circuit 30B is used. As shown in FIGS. 11D and 11E, the sampling period obtained when the second filter means is selected is smaller than that obtained when the first filter means is selected. In other words, the holding time of the second sample & hold circuit 30B when the second filter means is selected is shorter than that of the circuit 30B when the first filter means is selected. Accordingly, time required for A/D conversion by the A/D converter 31 is determined by the holding time obtained when the second filter means is selected. This means that the holding time of the second sample & hold circuit 30B becomes longer than the A/D conversion time when the first filter means is selected. In order to solve this problem, the frequency of the transfer clocks for the photoelectric outputs obtained when the first filter means is selected can be selected to be larger than that obtained when the second filter means is selected. The holding time of the second sample & hold circuit 30B is thus the same when either of the first and second filter means is selected.

The operation means 33 performs operations based on the filtered outputs stored in the memory 32 and produces a focus detection signal Zi(1) and an information amount signal Di(1). The discrimination means 34 compares the signals Zi(1) and Di(1) with the corresponding predetermined values Zo(1) and Do(1). (a) When Di(1) is equal to or larger than Do(1)

In this case, the discrimination means 34 generates a memory update signal at the output terminal 34b so that the current focus detection signal Zi(1) is stored in the memory 35. The display unit 36 and the driving unit 37 perform the display operation and the driving operation of the imaging optical system 1 based on the stored signal Zi(1). When the signal Zi(1) is equal to or larger than the predetermined value Zo(1), the discrimination means 34 continues to produce a first filter selection signal. Accordingly, when the photoelectric device 21 produces the series of photoelectric outputs a1, b1, ..., an, bn, the overall circuitry performs the operation as described above.

Figure 10C:
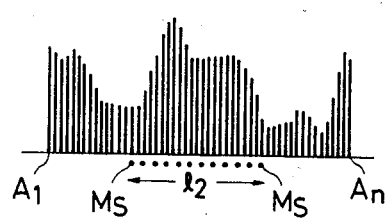

When the signal Zi(1) is smaller than the predetermined value Zo(1), the discrimination means 34 produces an H level signal as a second filter selection signal at the output terminal 34a. In response to the second filter selection signal, the filter selecting means 29 selects the second filter means 29. The gate means 42 and 44 transmit the first- and second-counter second preset values from the setting circuit 41 to the first and second counters 39 and 40, respectively. Thereafter, the series of photoelectric outputs a1, b1, ..., an, bn read out from the photoelectric device 21 is filtered by the second filter means 28 and converted into the outputs A1, B1, ..., An, Bn. FIG. 10C shows the a series filtered outputs A1, A2, ..., An. It is seen from a comparison of FIGS. 10C and 10B that the waveform shown in FIG. 10C is less smooth, i.e., the second filter means 28 passes a larger amount of high spatial frequency components than the first filter means 27. Meanwhile, in response to readout of the photoelectric outputs, the first counter 39 counts the transfer clocks from the AND gate 43. When the count of the first counter 39 reaches the second preset value, the counter 39 produces a start signal. Since the first-counter second preset value when the second filter means is selected is set to be larger than the first-counter first preset value when the first filter means is selected, the time when the start signal is generated is lagged from that obtained when the first filter means selected. In response to the start signal, the sampling pulse generating circuit 38 genreates the first and second sampling pulses SP3 and SP4 as shown in FIGS. 11D and 11E, respectively. In accordance with the second filter selection signal supplied from the discrimination means 34, the periods of the sampling pulses SP3 and SP4 are selected to be shorter than ($\frac{1}{2}$ times in this embodiment) those of the sampling pulses SP1 and SP2 which are used when the first filter means is selected. As shown in FIGS. 11D and 11E, the first and second sample & hold circuits 30A and 30B sample the filtered outputs A1, B1, ..., An, Bn at the period which is $\frac{1}{2}$ times that when the first filter means is selected. The circuits 30A and 30B then produce outputs A8, B8, A10, B10, A12, B12, .... The second counter 40 counts the second sampling pulses SP4. When the count of the pulses SP4 reaches the second preset value, the second counter 40 generates an end signal to stop the generation of the sampling pulses SP3 and SP4. Since the second-counter second preset value is set equal to the second-counter first preset value obtained when the first filter means is selected, the number of sampled, filtered outputs A8, B8, A10, B10, ... is equal to that obtained when the first filter means is selected.

Of the filtered outputs which are sampled in this manner, those which are associated with the first photoelectric element array are indicated with marks Ms in FIG. 10C. In this embodiment, the sampling period and sampling number when the first filter means is selected are twice or the same as those when the second filter means is selected respectively. Accordingly, a sampling region 11 shown in FIG. 10B is twice the sampling region 12 shown in FIG. 10C. Note that the sampling numbers when the first and second filter means are selected respectively need not be the same. In the graphs shown in FIGS. 11D and 11E, the sampling start timings are shown to be earlier than the actual timings for the sake of ease in drafting these graphs.

The sampled outputs are supplied to the operation means 33 through the A/D converter 31 and the memory 32. Since the filtered outputs contain a larger amount of high spatial frequency components than that obtained when the first filter means is selected, the focus detection signal Zi(2) has a higher precision at proximity of the in-focus position. When the conditions of Di(2)≧Do(2) and |Zi(2)|≦Zo(2) are satisfied, the discrimination means 34 continues to produce a second filter selection signal at the output terminal 34a and produces a memory update signal at the output terminal 34b. Then, the current focus detection signal Zi(2) is stored in the memory 35. The display and imaging optical system driving are performed in accordance with the focus detection signal thus stored in the memory 35. However, when the conditions Di(2)≧Do(2) and |Zi(2)|>Zo(2) are satisfied, the discrimination means 34 produces a first filter selection signal.

(b) When Di(1) or Di(2) is smaller than Do(1) or Do(2), respectively

In this case, independently of the focus detection signal Zi, the discrimination means 34 produces at the output terminal 34a a second filter selection signal if the first filter means is currently selected, and a first filter selection signal if the second filter means is currently selected. Then, the filter selecting means 29 selects the corresponding filter means. Since the focus detection signal Zi obtained when the signal Di is smaller than Do has a very low precision, the discrimination means 34 does not produce a memory update signal in this case. Accordingly, this signal Zi is not used for display and imaging optical system driving operations. Selection of the filter means independently of the signal Zi is performed for the following reason. For example, if an object does not contain a substantial amount of low spatial frequency components but contains a large amount of high spatial frequency components, or vice versa, necessary information can be obtained if the second filter means 28 or the first filter means 27 is selected.

In this embodiment, when the first filter means is selected, in other words, when the relative displacement between the first and second object images on the first and second photoelectric element arrays is great, the sampling region 11 is selected to be wide as shown in FIG. 10B. On the other hand, when the second filter means is selected, in other words, the displacement as described above is small, the sampling region 12 is set to be narrow as shown in FIG. 10C. This is effective for precise focus detection. To explain it in more detail, if the sampling region is wide, the displacement of the object images can be detected even if the object images are relatively deviated from each other significantly. This means that the defocus amount can be detected even if the photo-taking lens is significantly spaced apart from the in-focus position. On the other hand, if the sampling region is wide, objects at different distances or an object of a great depth can enter into the sampling region. Focus detection when the defocus amount is great need only be discrimination between a front- or rear-focus state or rough determination of the defocus amount; the absolute value of the defocus amount need not be determined precisely. For this reason, an object of a relatively great depth or the like can enter the sampling region in this case of great defocus amount. However, if the defocus amount is small and its absolute value must be determined precisely, the presence of an object of a great depth or the like can lead to a big error in focus detection. Therefore, focus detection precision can be improved when the second filter means is used, and when the sampling region is narrowed so that a possibility of an object of a great depth entering into the sampling region is reduced to the minimum.

In general, even if the sampling region is widened, the sampling period need not be increased. For example, the sampling region 11 associated with the output shown in FIG. 10B can be smaller than the sampling pitch 4Po; sampling can be performed at a pitch Po or 2Po. However, when the sampling pitch is reduced to Po or 2Po, the number of sampled data becomes four times or twice. This leads to a larger capacity of the memory 32 and a larger amount of operations to be performed by the operation means 32, which is not preferable. Accordingly, it is extremely advantageous to keep the sampling number the same even if the sampling region is changed as in this embodiment.

Thus, when the first filter means which passes only the low spatial frequency components is selected, the sampling period is set to be 4Po. However, when the second filter means which passes the high spatial frequency components is selected, the sampling pitch can be reduced to 2Po. This is very advantageous for effective use of information. The relationship between the sampling pitch and the filter MTF characteristics will now be described in detail. Since the sampling pitch is 4Po when the first filter means is selected, the corresponding Nyquist frequency is 1/8Po. Since the frequency components above the frequency 1/8Po can lead to an erroneous operation as per sampling theorem, such components are preferably eliminated. As shown in FIG. 9B, the MTF characteristics of the first filter means are set such that the components around and above the Nyquist frequency 1/8Po are sufficiently suppressed and the components below this frequency are passed. Accordingly, the components passed through the first filter means can be effectively utilized. However, if the sampling pitch is set to be Po when the first filter means is selected, the Nyquist frequency becomes 1/2Po so that the spatial frequency components below this frequency can also be used for focus detection. However, as shown in FIG. 9B, the components above the frequency 1/8Po are eliminated by the first filter means. Accordingly, even if the sampling pitch is Po and the sampling number is four times that when the sampling pitch is 4Po, the amount of the spatial frequency components available for operation remains the same and an increase in the sampling number as described above does not provide any better result. As may be seen from the above description, the sampling pitch is preferably set such that the Nyquist frequency which is determined by this sampling pitch is near the limit defining the MTF frequency band of the filter means.

A transversal filter as an example of the filter means 27 and 28 shown in FIG. 8 will now be described.

Figure 12A:
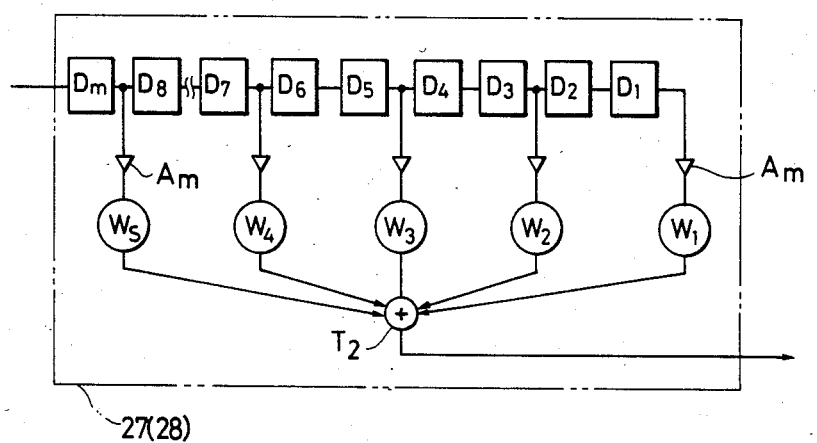
FIGS. 12A and 12B are block diagrams showing configurations of the filter means.

FIG. 12A shows a transversal filter which sequentially receives data or photoelectric outputs a1, b1, a2, b2, . . . , an, bn. Delay circuits D1 to Dm corresponding to one pixel are connected in series with each other. Multipliers W1 to Ws are respectively connected to the delay circuits D1, D3, D5, . . . , Dm through amplifiers Am, respectively. These multipliers W1 to Ws multiply the inputs with corresponding weighting coefficients W1 to Ws. The weighting coefficients may be positive or negative values. An adder T2 adds the outputs from the respective multipliers. A series of data a1, b1, a2, b2, . . . , an, bn from the photoelectric device 21 are supplied to this filter. When the first data a1 reaches the delay circuit D1, the adder T2 produces a1.W1+a2.W2 +, . . . , +am.Wm as the filtered outputs. When the second data b1 reaches the delay circuit D1, the adder T2 produces b1.W1+b2.W2+, . . . ,+bm.Wm. Likewise, as the data is sequentially shifted, the adder T2 alternately produces the a and b series filtered outputs.

Figure 12B:
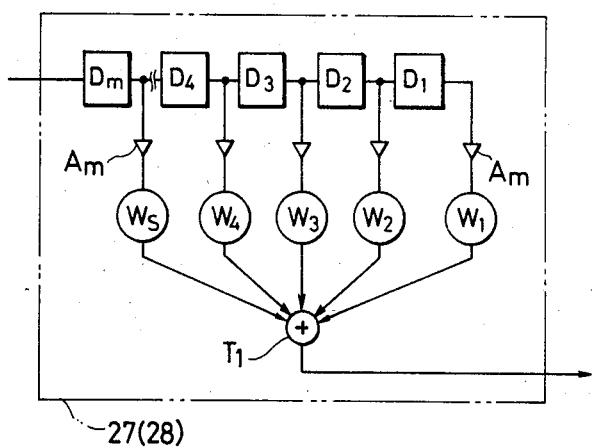

FIG. 12B shows a transversal filter which sequentially receives the data in the order of a1, a2, . . . , an, b1, b2, . . . , bn.

Filtering wherein date of a series of data are multiplied with corresponding weighting coefficients and the obtained products are summed will be referred to as weighting/adding, and a filter for performing such weighting/additing will be referred to as a weighting-/adding filter.

The weighting coefficients W1 to Ws for providing predetermined MTF characteristics may be determined in various manners and are not limited to a single combination. Some examples will be described below.

Figure 9F:
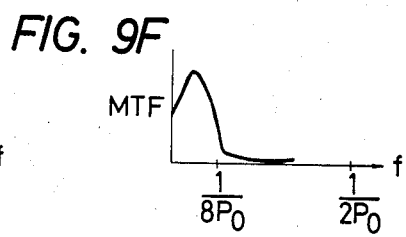

In order to realize a filter means having the MTF characteristics as shown in FIG. 9C, Ws is selected to be W5, and the weighting coefficients W1 to W5 are selected such that the relative magnitudes are as shown in FIG. 13A. As an example, the weighting coefficients may be determined such that W1=0.28, W2=0.76, W3=1, W4=0.76, and W5=0.28. Similarly, in order to implement a filter means having the MTF characteristics as shown in FIG. 9B, Ws is determined to be W9, and the weighting coefficients W1 to W9 are determined as shown in FIG. 13B. As an example, the weighting coefficients may be determined such that W1=0.28, W2=0.52, W3=0.76, W4=0.94, W5=1, W6=0.94, W7=0.76, W8=0.52, and W9=0.28. The weighting coefficients as shown in FIGS. 13C and 13D may be used to obtain the MTF characteristics as shown in FIG. 9D, the weighting coefficients as shown in FIGS. 13E and 13F may be used to obtain the MTF characteristics indicated by the dotted curve e1 and the solid curve e2 shown in FIG. 9E, and the weighting coefficients as shown in FIG. 13G may be used to obtain the MTF characteristics as shown in FIG. 9F.

A combination of the first and second filter means can be obtained by suitably combining the MTF characteristics as shown in FIGS. 13A to 13G.

FIG. 14 shows the configuration of the discrimination means 34 shown in FIG. 8.

Figure 14A:
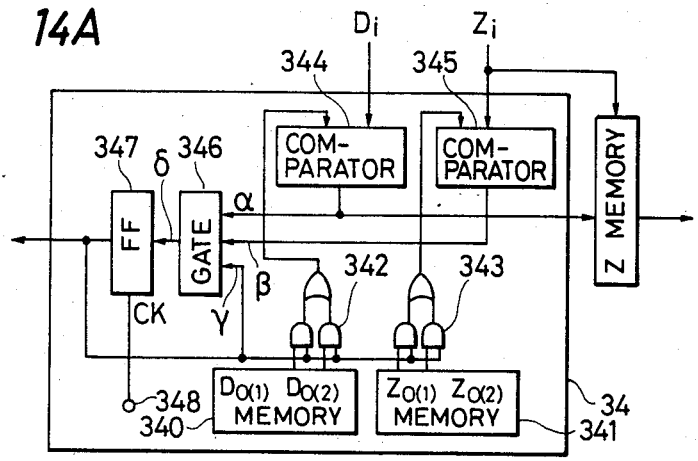
FIGS. 14A and 14B are block diagrams showing a configuration of a discriminating means.
Figure 14B:
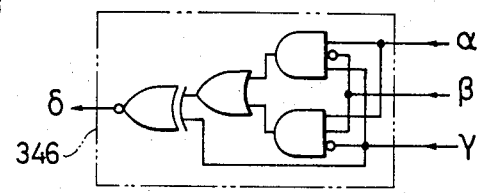

Referring to FIG. 14A, first and second memories 340 and 341 supply predetermined preset values Do(1) and Do(2), and Zo(1) and Zo(2) to comparators 344 and 345 through gate means 342 and 343, respectively. The comparator 344 compares one of the outputs Do(1) and Do(2) from the memory 340 which is selected by the gate means 342 with an information amount signal Di from the operation means 33. Similarly, the comparator 345 compares one of the outputs Zo(1) and Zo(2) from the memory 341 which is selected by the gate means 343 with a focus detection signal Zi. A gate means 346 receives an output α from the comparator 344, an output β from the comparator 345, and an output γ from the discrimination means 34. The configuration of the gate means 346 is shown in FIG. 14B. In response to a clock pulse from a terminal 348 after the generation of the outputs α and β, a D-type flip-flop 347 stores an output δ from the gate means 346. An updated output from the flip-flop 347 is used as an output from the discrimination means 34. The operation of the discrimination means 34 is shown in Table below.

TABLE

| α | H | H | L | L | H | H | L | L |
| β | H | L | H | L | H | L | H | L |
| γ | H | H | H | H | L | L | L | L |
| δ | L | H | L | L | L | H | H | H |

α = L for Di(1) < Do(1) or Di(2) < Do(2)
α = H for Di(1) ≧ Do(1) or Di(2) ≧ Do(2)
β = L for |Zi(1)| < Zo(1) or |Zi(2)| < Zo(2)
β = H for other cases In the description of the second embodiment, a plurality of filter means is switched, the sampling region 11 or 12 is switched, and the sampling pitch is switched in accordance with the magnitude of the defocus amount Zi. However, a quite good effect may be obtained even if the sampling region and the sampling pitch alone are switched in accordance with the defocus amount Zi. For example, a filter having the MTF characteristics as shown in FIG. 9C is used as the filter means. When the optical system is near the in-focus position, operations are performed to calculate the defocus amount based on the data which is sampled within the sampling region 12 at the sampling pitch 2Po as shown in FIG. 10C. However, when the optical system is not near the in-focus position, although the same filter means is used, the operations are performed based on the data which is sampled within the sampling region 11 at the sampling pitch 4Po as shown in FIG. 10B. In this case, as compared with a case wherein the MTF characteristics of the filter means are switched to those shown in FIG. 9B, some components of frequencies higher than the Nyquist frequency are extracted. For this reason, an erroneous operation tends to be caused, and the possibility of generation of a pseudo in-focus signal is increased due to the presence of the high spatial frequency components. However, a quite good effect is obtained since blurring of the optical images deceases high spatial frequency components significantly when the defocus amount is great. When a single filter is used, it is not limited to one which has the MTF characteristics as shown in FIG. 9C but may be other filters such as one having the characteristics indicated by the dotted curve e2 shown in FIG. 9E.

In both of the first and second embodiments, one of the focus detection signals based on the output from the first filter means and the output from the second filter means is selected in accordance with the defocus amount. A third embodiment of the present invention will now be described wherein the respective focus detection signals are combined in a predetermined relationship instead of using one selected output.

Figure 15:
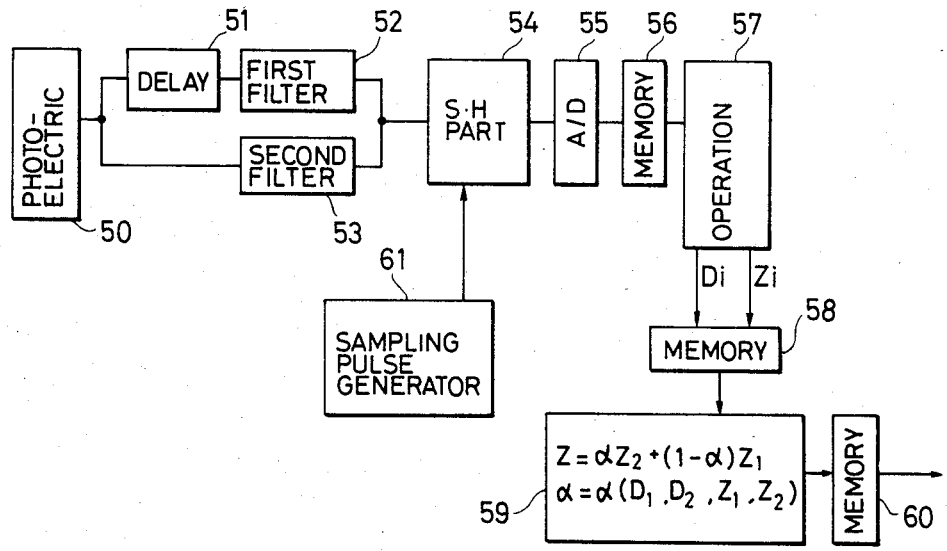
FIG. 15 is a block diagram showing circuitry of a third embodiment of the present invention.

Referring to FIG. 15, a series of photoelectric outputs a1, b1, a2, b2, . . . , an, bn are supplied to a first filter means 52 through a delay means 51 and to a second filter means 53 directly. The photoelectric device 50 is of the same configuration as that used in the first and second embodiments described above. The first and second filter means 52 and 53 are also of the same configuration as those used in the first and second embodiments. The delay time of the delay means 51 is set such that after the filtered output from the second filter means 53 is completely supplied to a sample & hold means 54, the filtered output from the first filter means 52 is supplied to the means 54. It is to be noted that the delay means 51 can alternatively be arranged at the side of the second filter means 53. The sample & hold means 54, and subsequent A/D converter 55, memory 56, and operation means 57 are of the same configurations as those used in the second embodiment. The operation means 57 first performs the operations based on the filtered output from the second filter means 53 to produce signals Di(2) and Zi(2) and then performs the operations based on the filtered output from the first filter means 52 to produce signals Di(1) and Zi(1). A memory 58 stores all of the signals Di(1), Di(2), Zi(1) and Zi(2) from the operation means 57. A combining means 59 receives the signals from the memory 58 and produces an output Z which is obtained by combining the signals Zi(1) and Zi(2) in a predetermined relationship. More specifically, the combining means 59 performs a calculation $Z=(1-\alpha)Zi(1)+\alpha Zi(2)$ where a weighting coefficient $\alpha$ is a number falling within a range of 0 to 1 and is determined in accordance with the magnitudes of the signals Zi(1), Zi(2), Di(1), and Di(2). The value of the coefficient $\alpha$ is determined in the following manner. When the signal Zi(1) or Zi(2) is small, i.e., when the imaging optical system is near the in-focus position, the coefficient $\alpha$ is set to be 1 or a value close to 1 such that the signal Zi(2) based on the output from the second filter means 53 is enhanced. On the other hand, when the signal Zi(1) or Zi(2) is sufficiently large, the coefficient $\alpha$ is set to be zero or a value close to zero so that the signal Zi(1) based on the output from the first filter means 52 is enhanced. When the signal Di(2) is very small while the optical system is near the in-focus position, the signal Zi(2) has only a low precision. Accordingly, if the signal Di(1) is large, the weighting coefficient for the signal Zi(1) is increased. On the other hand, when the signal Di(1) is very small and the signal Di(2) is large even if the optical system is not near the in-focus position, the weighting coefficient for the signal Zi(2) is increased.

A memory 60 stores the output Z obtained when at least one of the signals Di(1) and Di(2) has exceeded the predetermined value Do(1) or Do(2), respectively. The display and imaging optical system driving operations are performed in accordance with the output from the memory 60, as in the case of the first and second embodiments described above. A sample & hold means 61 is of the same configuration as that shown in FIG. 8.

The weighting coefficient series of a weighting/adding filter as shown in FIGS. 13E, 13F and 13G is disadvantageous in that the number of individual weighting coefficients becomes so large that the weighting/adding filter becomes complex in structure or weighting/adding processing requires a long time. This will be described with reference to a fourth embodiment of the present invention below.

Figure 16:
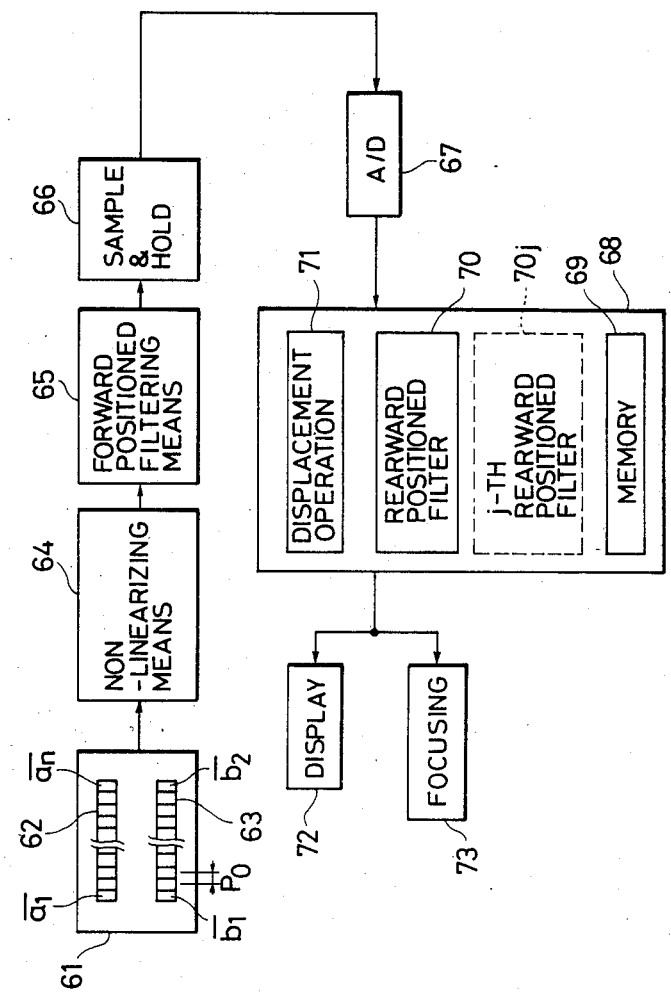
FIG. 16 is a block diagram showing a fourth embodiment of the present invention.
Figure 17:
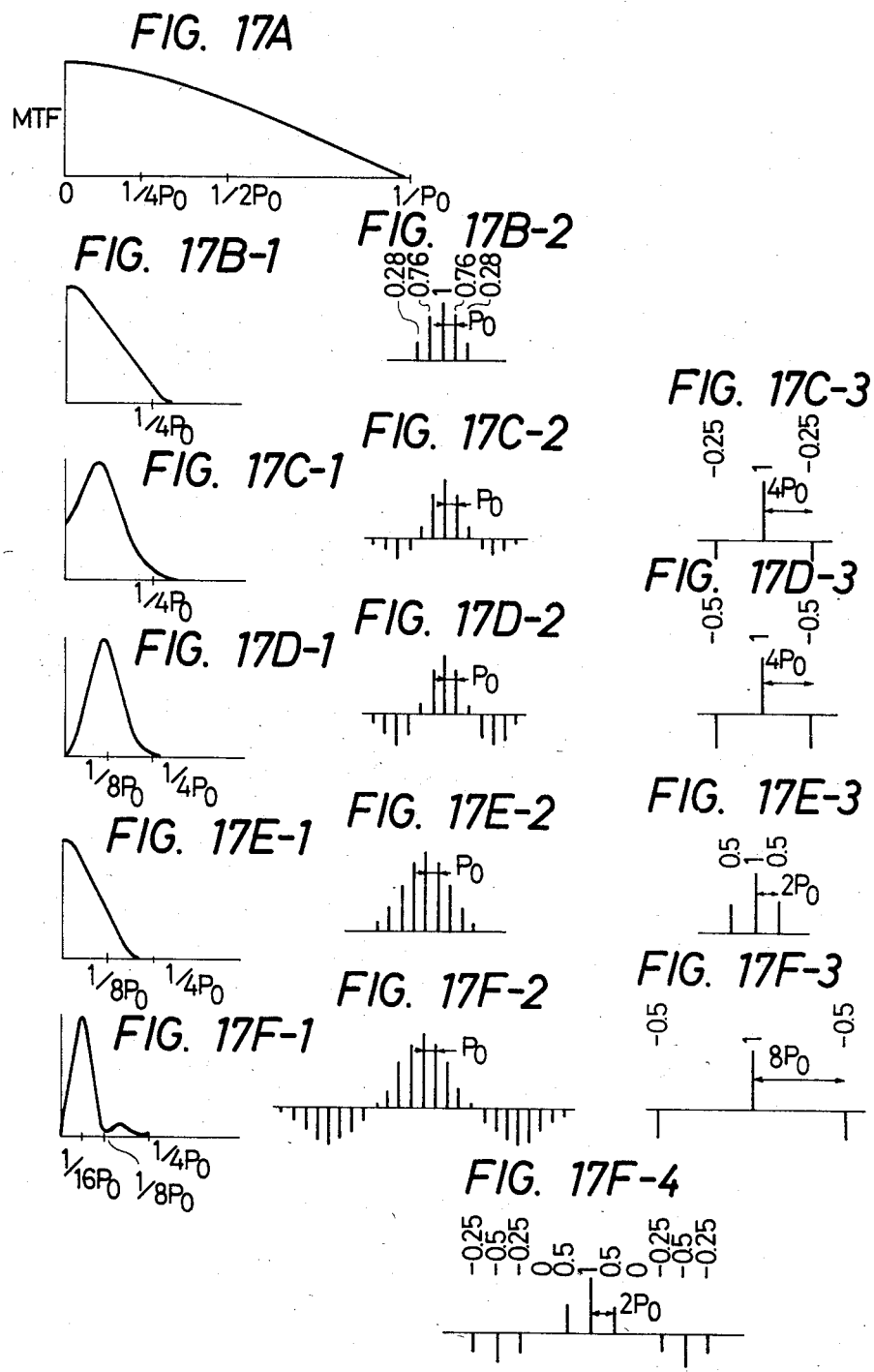

Referring to FIG. 16, a photoelectric device 61 is of the same configuration as the photoelectric device 21 shown in FIG. 8, and has a pair of photoelectric element arrays 62 and 63. The array 62 produces an a series of data a1, a2, . . . , an, and the array 63 produces a b series of data b1, b2, . . . , bn. FIG. 17A shows the MTF characteristics of the arrays 62 and 63.

The a series primary data ai and the b series primary data bi from the photoelectric device 61 are logarithmically amplified at 64 and are then supplied to a forward positioned filter means 65. The forward positioned filter means 65 comprises a hardware item, for example, a transversal filter as shown in FIGS. 12A or 12B. Weighting coefficients W1 to W5 of the prefilter means are, for example, 0.28, 0.76, 1, 0.76, and 0.28, respectively, as shown in FIG. 17B-2. The MTF characteristics of a weighting/adding filter having this weighting coefficient series (0.28, 0.76, 1, 0.76, 0.28) are as shown in FIG. 17B-1. According to these MTF characteristics, the D.C. and low frequency components are sufficiently extracted and the frequency components above the frequency 1/4Po are eliminated. In other words, the spatial frequency components above the Nyquist frequency $f_N=1/2P$ determined by a sampling pitch P =2Po are eliminated.

The filtered data from the forward positioned filter means 65 is sampled and held at a sampling period or pitch P =2Po by a sample & hold means 66. In this manner, the a and b series primary data ai and bi of the spatial pitch Po are converted into a and b series secondary data Ai and Bi having the spatial pitch 2Po through the forward positioned filter means and the sample & hold means. Since the secondary data Ai and Bi have the pitch 2Po, the number of the secondary data is one half of the primary data ai and bi, respectively.

The secondary data Ai and Bi are subjected to A/D conversion by an A/D converter 67 and supplied to a microcomputer 68 to be stored in a memory 69 therein. The CPU (Central Processing Unit) of the microcomputer 68 has functions of filtering, displacement operation and so on. In order to visually present these functions, imaginary blocks are included in the block 68. Thus, the block 68 includes a rearward positioned filter section 70 for performing weighting/adding filtering and a displacement operation part 71 for performing displacement operations. The rearward positioned filter section 70 subjects the secondary data Ai and Bi in the memory 69 to filtering/adding processing using the weighting coefficient series (−0.25, 1, −0.25) having the spatial pitch 4Po shown in FIG. 17C-3 or the weighting coefficient series (−0.5, 1, −0.5) having the spatial pitch 4Po shown in FIG. 17D-3 so as to provide tertiary data. More specifically, since the secondary data Ai and Bi have the spatial pitch P =2Po, the rearward positioned filter section 70 multiplies the five consecutive secondary data (FIG. 17C-3 or 17D-3) with the weighting coefficient series (−0.25, 0, 1, 0, −0.25) or (−0,5, 0, 1, 0, −0.5).

The tertiary data has been thus subjected to the weighting/adding filtering processing by both the forward positioned filter means 65 and the rearward positioned filter section 70. FIG. 17C-1 shows the synthetic MTF characteristics of the two filters having the weighting coefficient series shown in FIGS. 17B-2 and 17C-3, and FIG. 17D-1 similarly shows the synthetic MTF characteristics of the filters having the weighting coefficient series shown in FIGS. 17B-2 and 17D-3.

The displacement operation part 71 calculates the relative displacement between the object images on the arrays 62 and 63 from the a and b series secondary data or the tertiary data. The calculated displacement is supplied to a display unit 72 for displaying the focusing state and to a focusing unit 73 for performing focusing of the phototaking lens.

Before describing the operation of the circuitry, the relationship between the spatial frequency components and the operation results will be described.

In general, when the data having the sampling pitch P is subjected to operations to detect a displacement, the spatial frequency components above the Nyquist frequency $f_N = 1/2P$ determined by the sampling pitch P may result in an erratic detection. However, the spatial frequency component around a frequency $f_N/2$ which is half the Nyquist frequency is extremely effective for providing high-precision operation results. Precision is lowered as the frequency decreases from $f_N/2$.

The mode of operation of the circuitry shown in FIG. 16 will now be described below.

Figure 18:
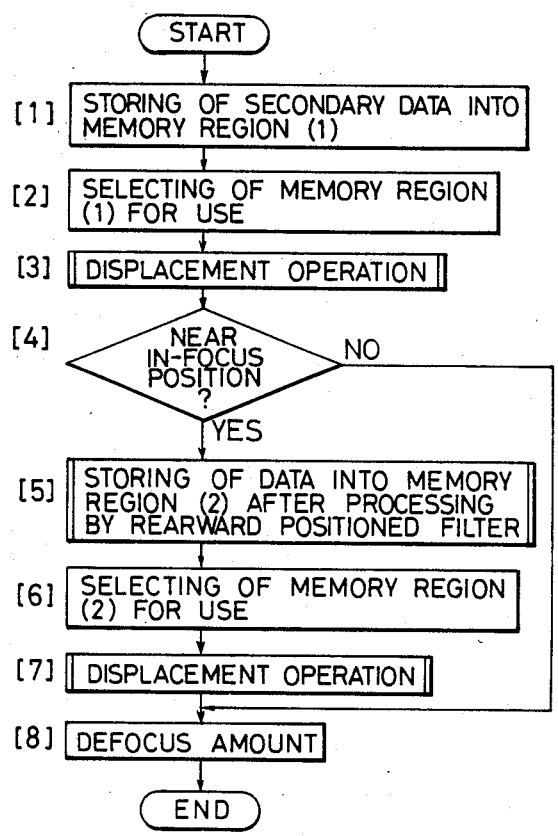
FIG. 18 is a flow chart of the system according to the present invention.

The primary data ai and bi having the spatial pitch Po and time-serially produced from the photoelectric device 61 are sequentially passed through a non-linearizing means 64 and the forward positioned filter means 65 and are then sampled by the sample & hold means 66 at the pitch P=2Po to be converted into the secondary data Ai and Bi having the spatial pitch 2Po. The secondary data Ai and Bi are then subjected to A/D conversion and are supplied to the microcomputer 68. As shown in FIG. 18, the microcomputer 68 stores the input secondary data Ai and Bi in a memory region or area (1) in step [1]. In step [2], the secondary data Ai and Bi stored are subjected to operations to calculate a value Lm associated with the displacement of the object images. The secondary data Ai and Bi have been subjected to the filtering processing by the forward positioned filter means 65 having the MTF characteristics as shown in FIG. 17B-1 and the non-desirable spatial frequency component above the Nyquist frequency $f_N = 1/4Po$ has been eliminated. Furthermore, since the secondary data Ai and Bi may contain a D.C. component, even if the displacement is relatively large and the object images are blurred, a displacement detection can be performed with a satisfactory precision.

In step [4], it is discriminated if the operation result Lm indicates that the photographic lens is near the focal plane, that is, if the value Lm is below a predetermined value. If NO in step [4], the flow immediately advances to step [8] wherein the defocus amount is calculated in accordance with the operation result Lm. On the other hand, if YES in step [4], there is a great possibility that the object images contain high spatial frequency components near the frequency $f_N/2$. In this case, a higher detection precision is obtained if the operations are performed based on the information which contains only high spatial frequency. Thus, the flow advances to step [5] in order to perform the displacement operation based on the high spatial frequency components. In step [5], the secondary data Ai and Bi are subjected to the weighting/adding processing using the weighting coefficient series shown in FIG. 17C-3 or 17D-3 to calculate the tertiary data which is stored in a memory region (2). Since the tertiary data has been subjected to the filtering having the MTF characteristics shown in FIG. 17C-1 or 17D-1, it is expected to contain a high spatial frequency of $f_N/2$ (=1/8Po or so) and no longer contain the D.C. component. The memory region (2) is selected in step [6], and the displacement operation is performed based on the tertiary data from the memory region (2) in step [7]. In step [8], the operation result Lm is converted into the defocus amount.

If the photographic lens is significantly deviated from the in-focus position, high-precision displacement detection is performed based on the secondary data which contains relatively large amount of the low spatial frequency components. On the other hand, if the phototaking lens is near the in-focus position, the high-precision displacement detection is performed based on the tertiary data which contains relatively large amount of high-order spatial frequency components.

The display unit 72 and the focusing unit 73 perform the display and focusing operations based on the defocus amount calculated in the manner described above.

In the above embodiment, the sampling pitch P of the sample & hold means 66 is determined to be 2Po. However, in general, the pitch P can be nPo (where n is a natural number). In this case, the MTF characteristics of the forward positioned filter means are so selected to eliminate the frequency component above the Nyquist frequency 1/2nPo is determined by the sampling pitch nPo. Logarithmic conversion performed by the non-linearizing means 64 has an effect of reducing the displacement detection error caused by vignetting. Accordingly, where the data is to be inputted to a weighting/adding filter for removing the D.C. component, the means 64 may be inserted anywhere before the D.C. component eliminating weighting/adding filter.

The memory region (2) may be replaced by the memory region (1). If the memory capacity has some margin to allow use of separate regions for the memory regions (1) and (2) and if the A/D conversion requires a considerable period of time and the CPU capacity has some margin, the filtering processing of step [5] may be performed simultaneously with the storage operation of step [1].

The characteristics of the forward positioned filter means and the rearward positioned filter means will be described.

The synthetic or composite MTF characteristics of the forward positioned filter having the weighting coefficient series shown in FIG. 17B-2 and the rearward positioned filter having the weighting coefficient series shown in FIG. 17C-3 or 17D-3 are as shown in FIG. 17C-1 or 17D-1. When the MTF characteristics shown in FIG. 17C-1 or 17D-1 are to be obtained with a single weighting/adding filter, the weighting coefficient series of the single weighting/adding filter becomes as shown in FIG. 17C-2 or 17D-2. The total number of the weighting coefficients used for the forward positioned filter and rearward positioned filter is 8, and the number of weighting coefficients of the single filter as described above is 13. Similarly, a combined filter comprising a series connection of three weighting/adding filters respectively having the weighting coefficient series shown in FIGS. 17B-2, 17E-3 and 17F-3 has the synthetic MTF characteristic as shown in FIG. 17F-1. These MTF characteristics can also be obtained with a single weighting/adding filter having the weighting coefficient series as shown in FIG. 17F-2. The total number of weighting coefficients of the combined filter is 11, and the number of weighting coefficients of the single filter is 25. The synthetic MTF characteristics of the combined filter having the weighting coefficient series shown in FIGS. 17E-3 and 17F-3 are the same as those of the single filter having the weighting coefficient series shown in FIG. 17F-4. The total number of the weighting coefficients of the combined filter is 6, and that of the single filter is 9.

In this manner, the MTF characteristics of a single weighting/adding filter can be generally obtained with a combined filter comprising a series connection of a plurality of weighting/adding filters. In this case, the total number of weighting coefficients of the plurality of weighting/adding filters is significantly smaller than that of the single weighting/adding filter. Such a decrease in the number of weighting coefficients can lead to a simplified hardware construction when the filter comprises hardware. If weighting/adding is performed by software, the processing time can be shortened.

As will be described with reference to a subsequent embodiment, a plurality of relatively simple weighting coefficient series may be used for the rearward positioned filter and one of such series may be suitably selected to be combined with the forward positioned filter, thereby easily providing a plurality of combined filters.

When the forward positioned filter has the MTF characteristics to remove the spatial frequency component above the Nyquist frequency determined by the spatial pitch of the data used for displacement operation, as in the case of the fourth embodiment, the following advantages are obtained. Since the output from the forward positioned filter is free from any component which might adversely affect the displacement operation, the output from the rearward positioned filter as well as that from the forward positioned filter may be used for calculating the displacement of the object images.

If the forward positioned filter comprises hardware and a plurality of filters are prepared as the rearward positioned filter, and the filtering processing by these filters is performed by software, the output from the forward positioned filter can be stored in the memory and the data read out from the memory can be used sequentially for filtering processing by the plurality of filters.

Figure 19A:
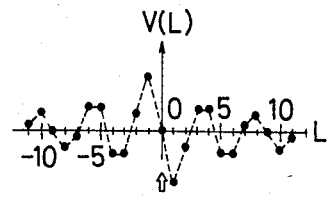
FIGS. 19A, 19B and 19C are graphs showing the relationship between the displacement amount and a function V(L)
Figure 19B:
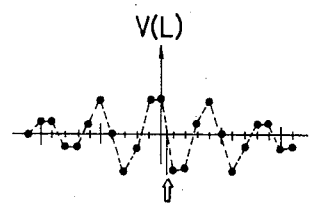
Figure 19C:
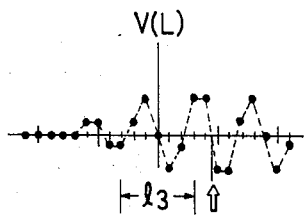

In the above description, the displacement operation is performed in the same manner as that disclosed in U.S. Pat. No. 4,333,007. This displacement operation has the following disadvantages. According to this displacement operation, correlation amount C(L) is calculated by shifting the a and b series data by a shift amount L in units of the pitch P. A calculation V(L) = C(L−1)−C(L+1) is performed based on these values. The function V(L) is plotted for each shift amount L in FIGS. 19A, 19B and 19C. FIGS. 19A, 19B and 19C respectively correspond to the displacements of zero, 0.5P and 4.5P, and the displacements are indicated by thick arrows. Adjacent plotted points are connected by line segments, and the slopes of the line segments are calculated. The maximum slope is determined, and a point at which the line segment having this maximum slope crosses the axis of abscissa is determined. This point defines the shift amount which provides the maximum correlation amount, i.e., the displacement.

However, this method is subject to a problem. That is, when the number of shift operations is small, erroneous detection can occur. For example, when the shift number L is 7 (−3, −2, −1, 0, 1, 2, 3), the line segment having the maximum slope within this shift region 13 is a line passing L=0. Accordingly, even if the displacement of the images is actually 4.5P, the displacement is erroneously detected to be zero.

An operation method which is free from this problem will now be described with reference to FIG. 20.

Figure 20:
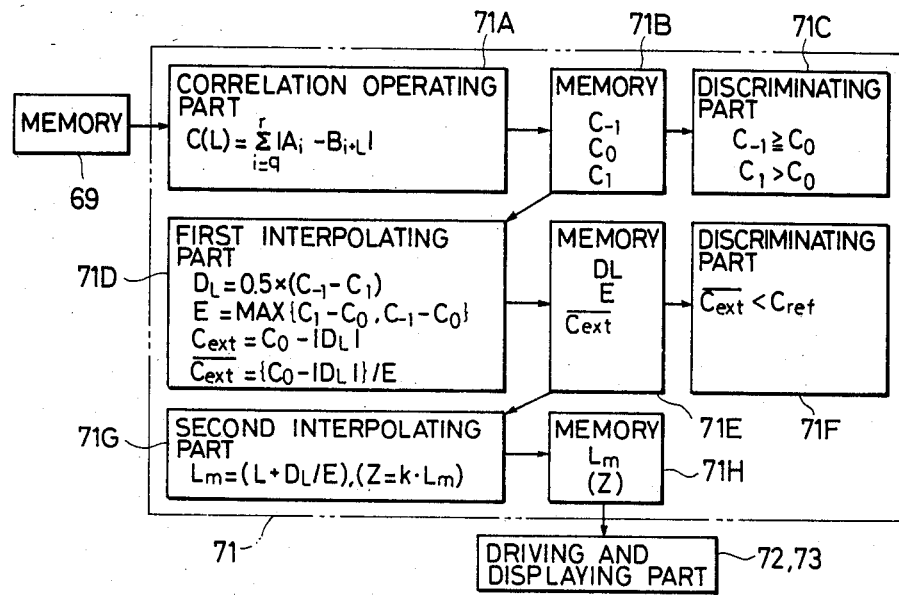
FIG. 20 is a block diagram showing a displacement operation section of the present invention.

Referring to FIG. 20, it is assumed that the memory 69 stores N a series data A1 to AN and N b series data B1 to BN. A correlation operating part 71A of the displacement operation part 71 shifts the a series data relative to the b series data by a predetermined number of data L and calculates the following correlation amount C(L):

$$C(L) = \sum_{i=q}^{r} |Ai - B(i + L)|$$

where the initial term q and the final term r may be set to be various values but preferably be set to be as follows:

$$q = \left[\frac{N+1}{2}\right] - \left[\frac{S-1}{2}\right] - \left[\frac{L}{2}\right]$$

$$r = S + (q - 1)$$

herein a mark [] denotes Gauss's notation and value S is a constant independent of the shift amount L. Such determination of the terms q and r enables accurate comparison between C(L−1) and C(L) or C(L) and C(L+1) which will be described hereinafter.

Figure 21A:
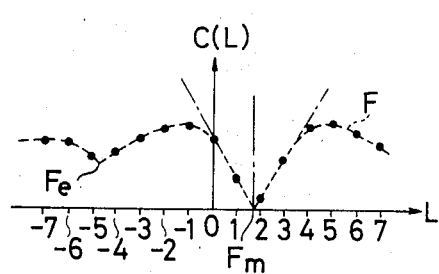
FIGS. 21A and 21B are graphs for explaining interpolation performed by the displacement operation section shown in FIG. 20.

A memory 71B stores three correlation amounts C(L−1)=C$_{-1}$, C(L)=C$_0$ and C(L+1)=C$_1$ when the data shift amount L is respectively L−1, L and L+1. A discriminating part 71C compares the magnitudes of C$_{-1}$ and $C_0$ and $C_1$ and determine if the conditions $C_{-1} \geq C_0$ and $C_1 > C_0$ are satisfied. The discriminating part 71C serves to determine if a correlation function F (indicated by the broken curve) obtained by interpolating discrete correlation amounts C(L) plotted as shown in FIG. 21A has a minimum value between $C_{-1}$ and $C_1$. When the above conditions are satisfied, the minimum value can possibly be present between $C_{-1}$ and $C_1$.

When the above conditions are satisfied, a first interpolating part 71D interpolates the minimum value $C_{ext}$ from the correlation amounts $C_{-1}$, $C_0$ and $C_1$ stored in the memory 71B in accordance with the following relations:

$$DL = 0.5 \times (C_{-1} - C_1) \quad (1)$$

$$E = MAX\{C_1 - C_0, C_{-1} - C_0\} \quad (2)$$

$$C_{ext} = C_0 - |DL| \quad (3)$$

where MAX $\{C_a, C_b\}$ indicates a larger one of $C_a$ and $C_b$ is selected.

Figure 21B:
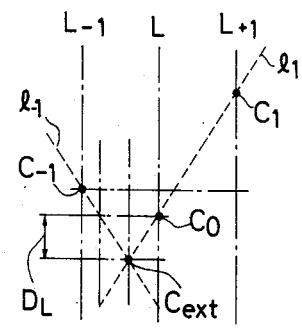

This interpolation method will now be described with reference to FIG. 21B. In the case shown in FIG. 21B, $C_0 < C_{-1} < C_1$. Of these three correlation amounts, the maximum value $C_1$ and the minimum value $C_0$ are connected by a line $l_1$, and a line $l_{-1}$ having a slope of the same absolute value as that of the line $l_1$ but of the opposite sign is drawn to pass the intermediate value $C_{-1}$. The intersection of the two lines $l_1$ and $l_{-1}$ provides the minimum value $C_{ext}$ of the correlation function F. When the distance between $C_0$ and $C_{ext}$ along the axis C(L) is designated by DL, it is given by the equation (1) above. Accordingly, the minimum value $C_{ext}$ is given to be $C_0 - |DL|$. Since the magnitude of the correlation amount C(L) changes largely depending upon the pattern of the object images, the minimum value is normalized such that it may not be dependent on the pattern of the object images. Using the term E in equation (2) above as a normalizing factor, the value obtained by dividing the term $C_0 - |CL|$ by E is given as the normalized minimum value $\overline{C}_{ext}$. If the minimum value is normalized so that it is not dependent on the object images, the minimum value of the correlation function F, that is, a correlation amount Fm which gives the maximum correlation is a value close to zero and is independent of the object images, as shown in FIG. 21A, and another minimum value Fe is quite large as compared to Fm.

A memory 71E temporarily stores outputs DL, E a $\overline{C}_{ext}$ operated by the interpolating part 71D.

A discriminating part 71F compares the minimum value $\overline{C}_{ext}$ stored in the memory 71E with a reference value $C_{ref}$. When the former is smaller than the latter, the discriminating part 71F produces a comparison output. The reference value $C_{ref}$ is determined to be a value intermediate between the correlation amount Fm which gives the maximum correlation and the other minimum value Fe. Accordingly, the discriminating part 71F discriminates if the minimum value Fe interpolated by the interpolating part 71D corresponds to the correlation amount Fm which gives the maximum correlation.

When the minimum value Fe is determined to correspond to the correlation amount Fm which gives the maximum correlation in accordance with the comparison output from the discriminating part 71F, a second interpolating part 71G interpolates a shift amount Lm corresponding to the correlation amount Fm in accordance with the equation Lm = L + DL/E.

A memory 71H stores the shift amount Lm which provides the maximum correlation which is supplied from the second interpolating part 71G. The second interpolating part 71G converts the shift amount Lm into a defocus amount Z in accordance with the equation $Z = k \cdot Lm$ and stores the Z in the memory 71H, where k is the coefficient for converting the shift amount Lm into the defocus amount Z.

The algorithm for performing the above operations will now be described with reference to the flow chart shown in FIG. 22.

Figure 22:
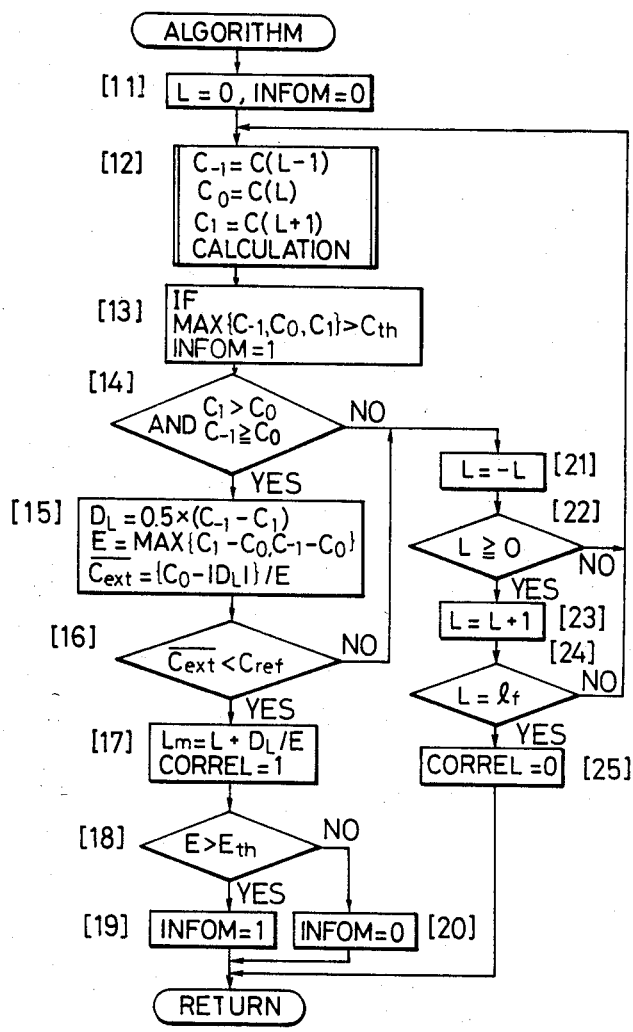
FIG. 22 is a flow chart of the displacement operation section shown in FIG. 20.

Referring to FIG. 22, in step [11], the microcomputer sets the shift amount L to zero and sets an information amount parameter Infom to be described later to zero. In step [12], correlation amounts C(L−1), C(L) and C(L+1) for the shift amounts of L−1, L and L+1 are calculated in accordance with the equation $$C(L) = \sum_{i=q}^{r} |Ai - B(i + L)|$$

and are stored in memories $C_{-1}$, $C_0$ and $C_1$ In step [13], if MAX $\{C_1, C_0, C_{-1}\} > C_{th}$, the Infom is set to be 1. In step [14], it is discriminated if the conditions $C_1 > C_0$ and $C_{-1} > C_0$ are satisfied. If the above conditions are satisfied, the values DL, E and $\overline{C}_{ext}$ are calculated in accordance with the contents of the memories $C_{-1}$, $C_0$ and $C_1$ in step [15]. In step [16], the normalized minimum value $\overline{C}_{ext}$ is compared with the reference value $C_{ref}$, and it is determined if the condition $\overline{C}_{ext} < C_{ref}$ is satisfied. If this condition is satisfied, in step [17], an interpolation shift amount Lm =(L +DL/E) is calculated and stored, and at the same time, a parameter Correl is set to 1 so as to indicate that the shift amount Lm falls within the maximum shift amount range.

In step [18], the parameter E is compared with a predetermined threshold value Eth. This comparison is performed for the following reason. In general, if the data Ai and Bi does not contain a sufficient amount of the effective spatial frequency components, then the parameter E decreases, and reliability of the operation results in steps [15] and [17] is lowered. Accordingly, the reliability of the operations in steps [15] and [17] can be determined from the magnitude of the parameter E. It should be noted that the parameter E serves a similar function to the information amount signal Di in the first embodiment.

When E > Eth, it is determined that the displacement operations are reliable and the parameter Infom is set to 1 in step [19]. However, if the condition E > Eth is not satisfied, the parameter Infom is set to 0 in step [20].

Meanwhile, if NO is obtained in step [14] or [16], the sign of the value L is inverted in step [21]. Since the shift amount L is currently set to be zero, the value L is also zero. In step [22], it is discriminated if the shift amount L satisfies the condition $L \geq 0$. If YES in step [22], the value L is incremented by 1 in step [23]. In the case under discussion, since L=0 and the condition of step [22] is satisfied, L=1 is set through step [23]. In step [24], the updated shift amount L is compared with a predetermined value lf. The predetermined value lf is an integer which determines the maximum shift amount. If NO in step [22] or step [24], the flow returns to step [12]. After a return to step [12] is made and the flow advances to step [21] again, since L=1, the sign of the value L is inverted to provide L=−1. Then, the flow returns to step [12] again through step [22]. In this manner, until the maximum correlation is obtained for lf=5, the shift amount L is sequentially incremented from 0 in the order of 0, 1, −1, 2, −2, 3, −3, 4, −4, and so on to finally determine the shift amount which gives the maximum correlation. If the shift amount L reaches the predetermined value lf without providing the maximum correlation, the parameter Correl is set to 0 in step [25] so as to indicate that the maximum correlation cannot be obtained even if the data is shifted to the maximum shift amount. The routine is then ended. Step [13] is for determining if the discrimination for Correl=0 is performed with a sufficient amount of information.

In the above correlation operation, the correlation amounts C(L) and C(L+1) for L=0 are equal to the correlation amounts CL−1) and C(L) for L=1. The correlation amounts CL−1) and C(L) for L=0 are equal to the correlation amounts C(L) and C(L+1) for L=−1. Similarly, C(L) and C(L+1) for L=1 are equal to CL−1) and C(L) for L=2. CL−1) and C(L) for L=−1 are equal to C(L) and C(L+1) for L=2. Despite this, in the flow chart shown in FIG. 22, three correlation amounts C(L−1), C(L) and C(L+1) for each L are all calculated. Since the calculation of each C(L) takes a considerable period of time, this means an increase in the operation time. Accordingly, in an actual program except for L=0, the previous correlation amounts are stored in a memory, and the amount to be calculated and updated alone is calculated. In this case, step [13] is replaced with a step for determining if an updated correlation amount C(L') is greater than Cth every time the correlation amount is changed.

According to the algorithm of displacement operation, L=0 is initially set, and the value L is sequentially incremented in the order of 1, −1, 2, −2, and so on. When a minimum value which satisfies the predetermined conditions is found, it can be determined to provide a maximum correlation even if the operation for the entire range of −lf≲L≲lf has not finished. In practice, during automatic focusing driving, the true focal point is frequently near L=0. Accordingly, generally only several operations in accordance with the equation (1) must be performed for the corresponding number of shift amounts, thus realizing a significant decrease in the processing time.

Focus using the displacement operation algorithm as described above will now be described with reference to FIG. 23.

The flow before obtaining the secondary data Ai and Bi having the spatial pitch 2Po from the a and b series primary data ai and bi having the spatial pitch Po is the same as that described with reference to the fourth embodiment.

The A/D converted secondary data Ai and Bi are stored in a memory region (1) in Step [31]. In step [32], weighting/adding filtering processing using the weighting coefficient series shown in FIG. 17C-3 or 17D-3 is performed to prepare the tertiary data free from the D.C. component and the tertiary data is stored in a memory region (2). In step [33], the memory region (2) is selected, and the maximum shift amount lf is set to lf2 (where lf2 is 2 or 3). In step [34], the displacement operation algorithm processing shown in FIG. 22 is performed for the high spatial frequency components near $f_N/2$ within range of the maximum shift amount. In step [35], it is discriminated if the maximum correlation is present within the maximum shift amount lf2 (Correl=1) and the reliability of the operation is sufficient (Infom=1). If YES in step [35], the shift amount Lm is converted into the defocus amount in step [36].

If NO in step [35], the memory region (1) is selected in step [37] and the maximum shift amount lf is set to lf1 (where lf1>lf2 and lf1=N/2). In step [38], the displacement operation algorithm processing as shown in FIG. 22 is performed based on the spatial frequency component containing a sufficient amount of D.C. component. Step [36] is executed in accordance with the processing result.

In this embodiment, the displacement operation is first performed based on the data from which the D.C. component is eliminated. If the result obtained is not satisfactory, the displacement operation is performed based on the data which contains the D.C. component. This order is opposite to that adopted in FIG. 18. If the automatic focusing control of the photo-taking lens is continuously performed, the photo-taking lens is almost always near the in-focus position. Accordingly, it is most frequent that YES is obtained in step [35], thereby significantly reducing the processing time.

Figure 23:
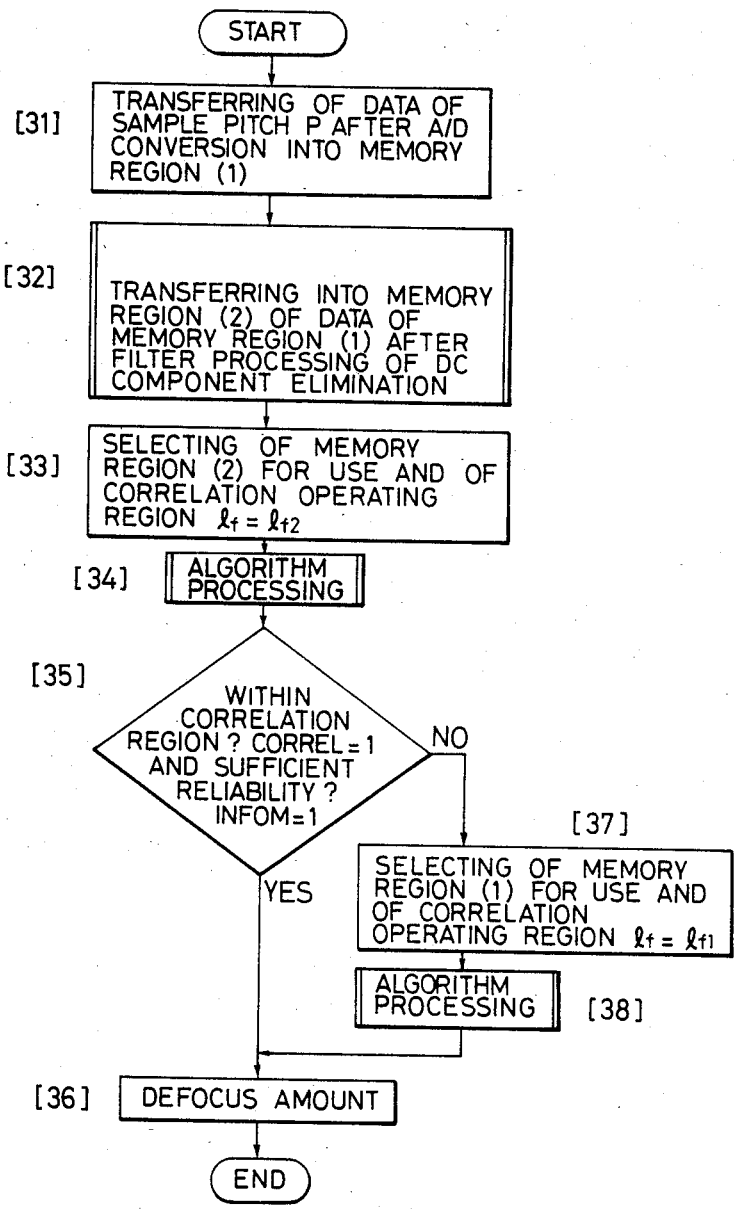
Figure 24:
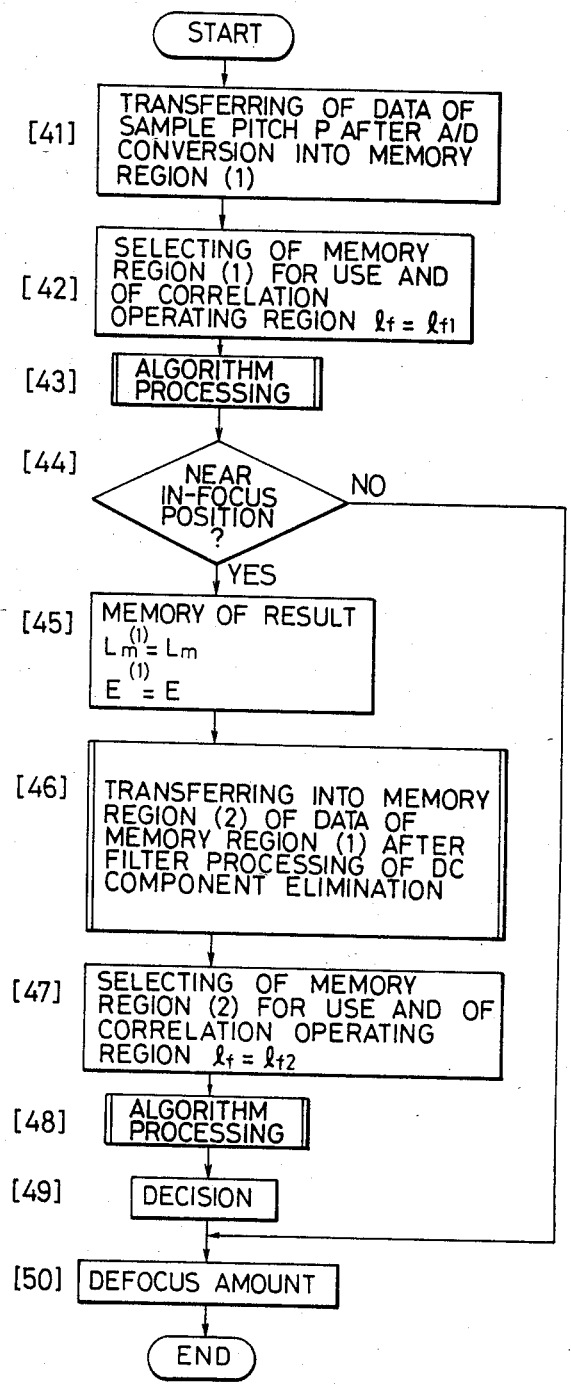

FIG. 24 shows another flow chart, and steps [41], [42], and [43] of FIG. 24 remain the same as the steps [31], [37], and [38] shown in FIG. 23. It is first discriminated in step [44] whether the interpolated shift amount Lm calculated based on the data containing a sufficient amount of the D.C. component represents that the photographic lens is near the in-focus position. If NO is obtained in step [44], the corresponding shift amount is converted into the defocus amount in step [50]. However, if YES in step [44], the operation results $Lm^{(1)}$ and $E^{(1)}$ obtained in step [43] are stored. Steps [46], [47] and [48] in FIG. 24 are the same as the steps [32], [33] and [34] in FIG. 8. In these steps, the values $Lm^{(2)}$ and $E^{(2)}$ are calculated based on the data which is free from the D.C. component. In step [49], one of the shift amounts $Lm^{(1)}$ and $Lm^{(2)}$ obtained by interpolation of the parameters $E^{(1)}$ and $E^{(2)}$ is selected. If the object contains only the spatial frequency component near the D.C. component, the reliability of the operation result $Lm^{(2)}$ obtained in step [48] is very low and the corresponding parameter E is also very small. Accordingly, if $E^{(2)}$ is below the threshold value Eth and $E^{(1)}$ is sufficiently great, $Lm^{(1)}$ is selected. Otherwise, $Lm^{(2)}$ is selected. In step [50], the defocus amount is calculated in accordance with the value Lm.

In the above description, the microcomputer performs only processing by a single rearward positioned filter. However, a case will now be described wherein the microcomputer performs processing by a plurality of rearward positioned filters.

Referring to FIG. 16, in order to clearly represent that the microcomputer 68 has a plurality of rearward positioned filters, a jth rearward positioned filter 70j is represented by the broken line block outside the rearward positioned filter section 70.

Figure 25:
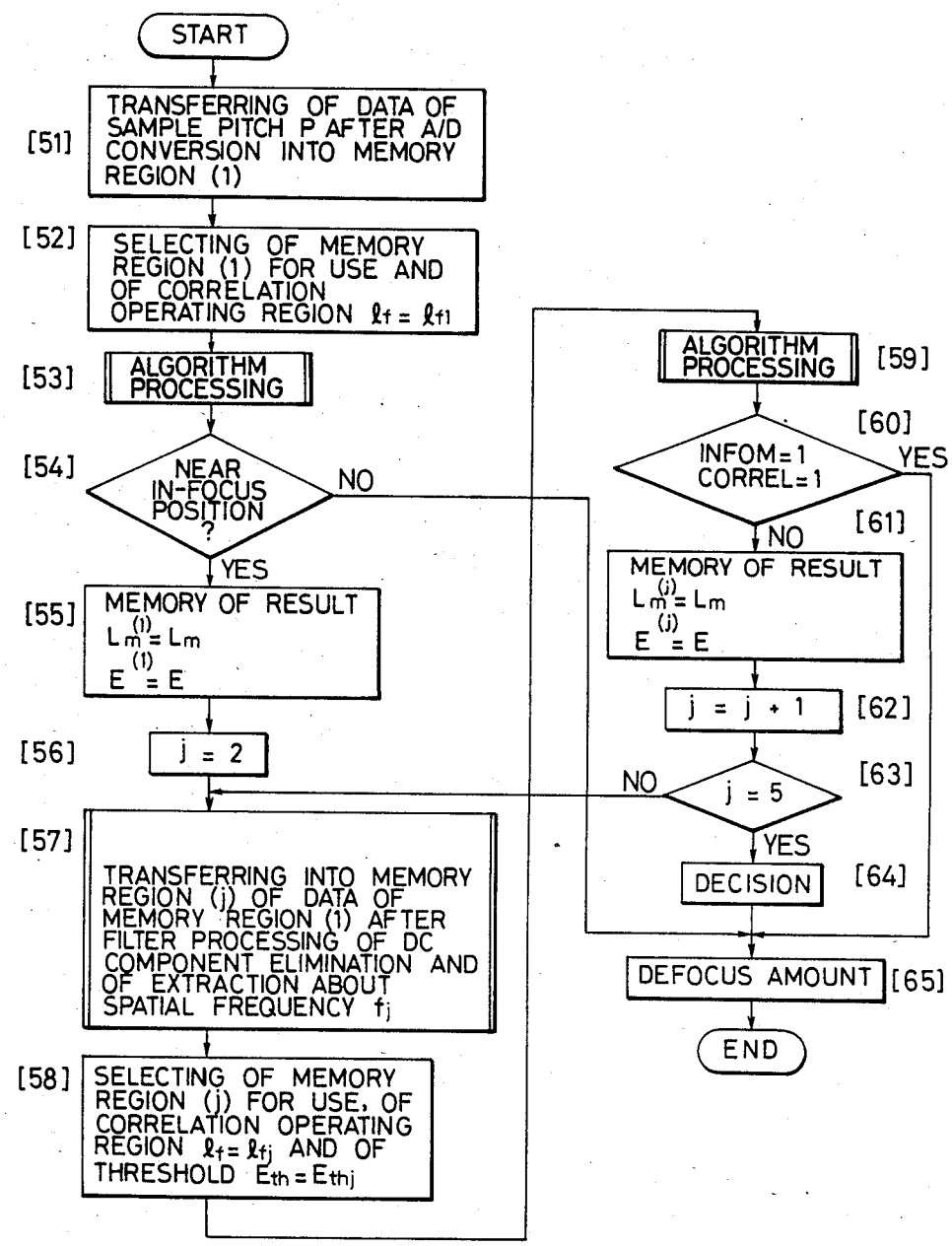

Referring to FIG. 25, steps [51] to [55] are the same as the steps [41] to [45] in FIG. 24. In step [55], operation results $Lm^{(1)}$ and $E^{(1)}$ obtained based on the data which contains the D.C. component are stored. In step [56], a parameter j is set to be 2. In step [57], the weighting/adding filtering processing having the weighting coefficient series shown in FIG. 17D-3 is performed on the data stored in the memory region (1). According to this filtering processing, the filter has the MTF characteristics wherein a peak frequency $f_2$ is obtained near ½ the Nyquist frequency $f_N=1/2P$ determined by the pitch P=2Po as shown in FIG. 17D-1, and the operation result data is stored in the memory region (2). In step [58], the memory region (2) is selected, 2 is set as the maximum shift amount lf=lf2, and the threshold value Eth=$Eth_2$ is set. Under these conditions, the algorithm processing as shown in FIG. 22 is performed in step [59]. Then, if it is determined in step [60] that Infom=1, and Correl=1, the corresponding interpolated shift amount Lm is used to calculate the defocus amount in step [65].

If NO in step [60], the corresponding operation results $Lm^{(2)}$ and $E^{(2)}$ are stored in step [61]. Subsequently, the parameter j is incremented by 1 to set j=3 in step [62]. In step [63], it is discriminated if j is 5. Since j=3 currently, the flow goes to step [57]. In step [57], the filtering is performed such that the peak frequency f3 for j=3 is near ½ the peak frequency $f_2$ as shown in FIG. 17F-1 and the D.C. component is sufficiently eliximated, and the filtered data is stored in a memory region (3). This filtering is perforxed by sequentially subjecting the data of the memory region (1) to the weighting/adding processing shown in FIG. 17E-3 and that shown in FIG. 17F-3.

The filtering processing for J=3 may be performed by only weighting/adding processing shown in FIG. 17F-3. That is, the weighting/adding processing shown in FIG. 17E-3 is not required for j=3. This is because the weighting/adding processing in FIG. 17F-3 serves to suppress the components between frequencies 1/8Po to 1/4Po and insufficient reliability of the operation, namely, Inform=0 for j=2 ascertains that the filtered data in the memory region (1) does not include said range of frequency components.

The processing in the subsequent steps [58] to [62] is the same as that for j=2. In step [62], the parameter j becomes 4. The weighting/adding filter in step [57] for j=4 has the MTF characteristics wherein a peak frequency f4 is near ¼ the peak frequency $f_2$ and the D.C. component is sufficiently eliminated. The subsequent steps are the same as those for j=3. Although the filter characteristics are sequentially changed in accordance with the incremented value of j in the above case, the maximum shift amount lfj may remain constant independently of the value of j. When the parameter j reaches 5, the flow goes to step [64] wherein a value of a highest reliability is selected from the interpolated shift amounts $Lm^{(1)}$, $Lm^{(2)}$, $Lm^{(3)}$ and $Lm^{(4)}$, based on the values of the data $E^{(1)}$, $E^{(2)}$, $E^{(3)}$ and $E^{(4)}$. If none of these amounts is reliable, selection is not made and the flow goes to step [65].

In the example described above, a maximum of three filtering processings is performed. However, the number of filtering processings to be performed may be changed as needed. Furthermore, as the parameter j increases, a filter for step [57] is selected wherein the MTF peak frequency sequentially shifts to the lower frequency side and the D.C. component is eliminated. Accordingly, even if the spatial frequency of the object contains a large amount of a specific frequency components, high-precision detection can be performed by one of the filtering processings as described above.

Figure 26:
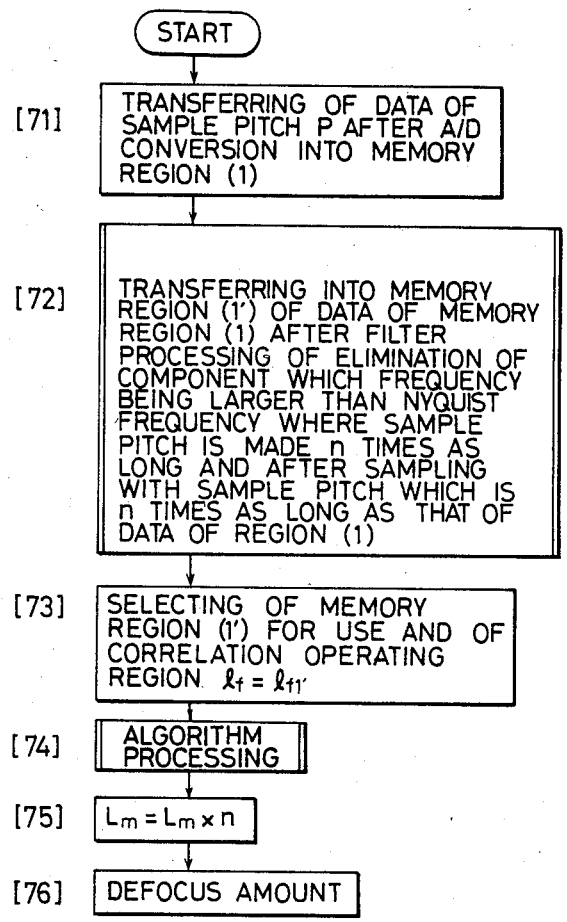

In the embodiments described above, the data having the sampling pitch P=2Po and stored in the memory region (1) is directly used for calculating the defocus amount when the photo-taking lens is not near the in-focus position. However, if the photo-taking lens is not near the in-focus position, the maximum shift amount lf is preferably set to be about N/2. However, when the number N of the a and b series data is 50, the operation time becomes quite long. If the defocus amount is to be calculated when the photo-taking lens is not near the focal plane, the calculation precision of the defocus amount is not very high. If the object images are blurred, the displacement operation can use data of relatively rough sampling pitch, so that the operation time can be shortened. An example of such a case will now be described with reference to FIG. 26.

The secondary data having the sampling pitch P and after A/D conversion is stored in a memory region (1) (step [71]). Filtering is performed to eliminate, from the data in the memory region (1), the spatial frequency component above the Nyquist frequency when the sampling pitch is multiplied with n, and the data sampled at the sampling pitch n×p is stored in a memory region (1') (step [72]). In general, it is preferable to perform filtering processing wherein the component above the Nyquist frequency is eliminated simultaneously when the sampling pitch is changed. However, if the defocus amount is large, the image is blurred. In such a case, the images do not contain the frequency component above the Nyquist frequency of the sampling pitch which is under discussion. Accordingly, the above-mentioned filtering processing can be omitted and sampling can be performed at the sampling pitch n×p.

Next, the memory region (1') is selected, and the maximum shift amount lf=lf1≅N'/2 is set. Note that the sampling number N' in this case is about 1/n of the sampling number N of the memory region (1) (step [73]). The obtained shift amount Lm is corrected by multiplication with n, that is, Lm×n→Lm (step [75]). Subsequently, the defocus amount is calculated (step [76]).

Figure 27B:
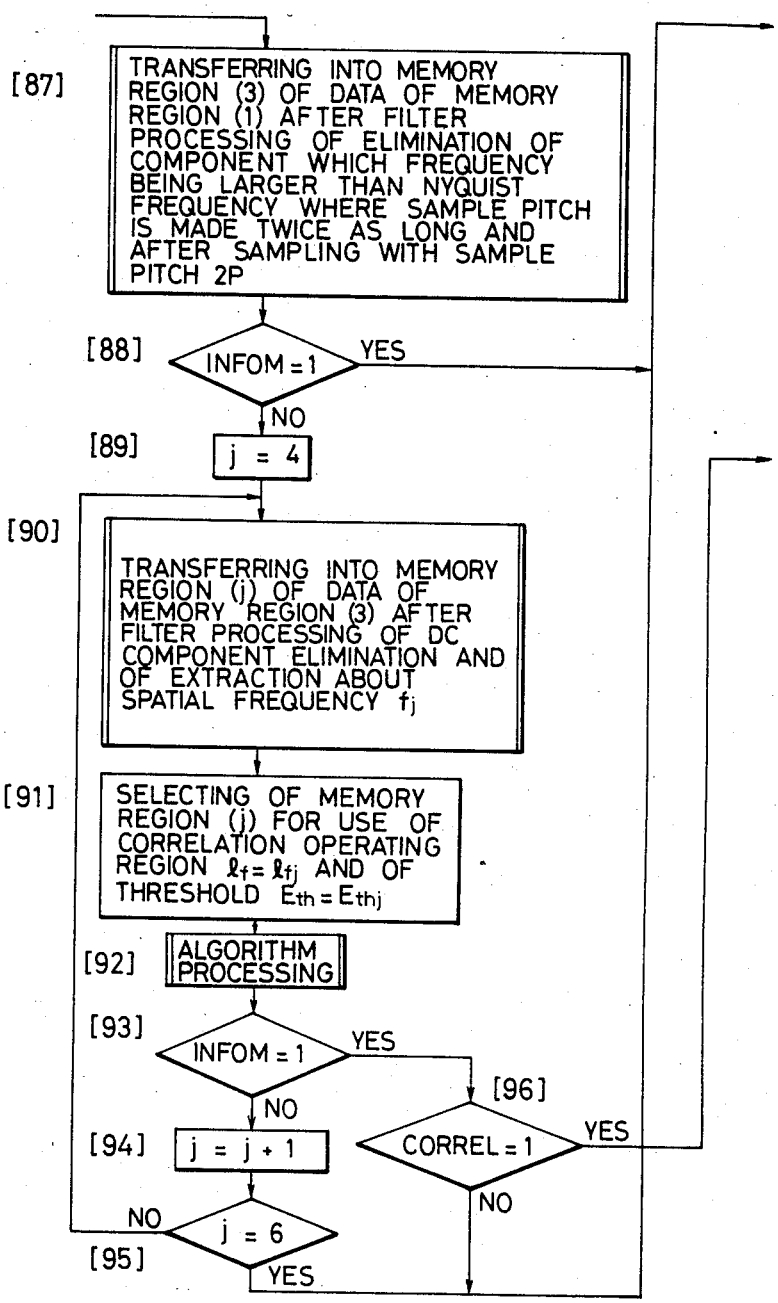
Figure 27C:
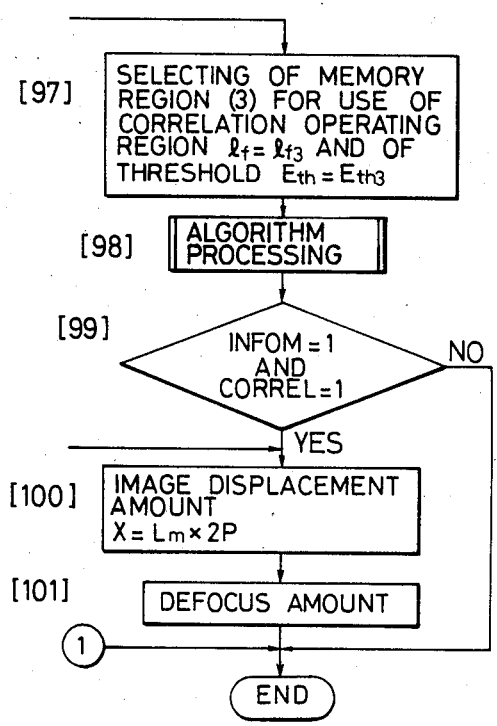

Reference will now be made to the flow chart shown in FIGS. 27A–27C, which are assembled as in FIG. 27. The secondary data filtered by a hardware filter having the characteristics shown in FIG. 17B-2 is stored in a memory region (1) (step [81]). In step [82], the data processed by the filter shown in FIG. 17D-3 is stored in a memory region (2).

The memory region (2) is selected, the maximum shift amount lf is set to be for example lf =lf2 =3, and the threshold value of the information amount is set to be Eth (step [83]). Based on this, the algorithm processing for calculating the shift amount shown in FIG. 22 (step [84]) is performed. If the information amount is sufficient (Infom=1) and the maximum correlation point is within the range of the maximum shift amount (Correl=1) (step [85]), the defocus amount is calculated from the obtained shift amount Lm (step [86]). If NO in step [85], the photo-taking lens is not near the in-focus position or even if the photo-taking lens is near the in-focus position the images contain only the frequency component lower than the spatial frequency f2=1/8Po. The subsequent operation can be performed using the sampling pitch of 2Po so as to shorten the overall processing time if the number of newly sampled data with pitch 2Po is enough. If the subsequent sampling pitch is designated by P', we have P'=2P=4Po.

More specifically, the filtering processing as shown in FIG. 17E-3 is performed (step [87]). In other words, weighting with the weighting coefficients of (0.5, 1, 0.5) is performed for the successive three terms of the data stored in the memory region (1) and new data is stored in a memory region (3) for the data of each P'=2P. The filter characteristics for this case are as shown in FIG. 17E-1 wherein substantially no spatial frequency component above the Nyquist frequency $f_N = 1/2P' = 1/8Po$ associated with the sampling pitch P' is present. If it is determined in step [88] that the information amount obtained as a result of the algorithm processing in step [84] is not sufficient (Infom = 1), it is determined that the photo-taking lens still has the possibility to be near the in-focus position and the flow goes to a loop for changing the filter which eliminates DC component. First, in step [89], the parameter j=4 is set as the initial value of the loop. In step [90], the data stored in the memory region (3) and having the sampling pitch $P'=2P=4Po$ is subjected to filtering processing with the weighting coefficient series having the spatial pitch 8Po as shown in FIG. 17F-3, and the data having the sampling pitch P' is stored in a memory region (4). The data stored in the memory region (4) is thus data obtained by a filter having characteristics to eliminate the D.C. component and to mainly extract the spatial frequency components near $f4 = 1/4P' = 1/16Po$, as shown in FIG. 17F-1. The memory region (4) is then selected, the maximum shift amount $lf = lf4 = 3$ is set, and the information amount threshold value $Eth = Eth_4$ is set (step [91]).

The algorithm processing as shown in FIG. 22 is performed (step [92]). If the information amount is sufficient (Infom = 1; step [93]) and the maximum correlation point falls within the range of the maximum shift amount (Correl = 1; step [96]), a displacement X is calculated by $X = Lm \times 2P$ using the corresponding value Lm and the sampling pitch 2P (step [100]).

If NO in step [93], the parameter j is incremented by 1 to set j=5. In this case, the flow returns to step [90] through step [95]. In step [90] filtering processing is performed wherein the D.C. component is eliminated from the memory region (3) and the frequency band has the center frequency of a spatial frequency f5 (f5 < f4), and the obtained data is stored in a data memory region (5). Here, filtering processing is performed for $f5 = (\frac{1}{2})f4 = 1/8P' = 1/32Po$. In this case, depending upon the filter used, the sampling pitch may be rendered more rough. However, if the sampling pitch is rendered too rough, the number of data available is decreased and the precision is degraded. Accordingly, it is not preferable to decrease the data number N below about 20 to 25.

Steps [91] and [92] are performed in the manner as described above. If the information amount is sufficient (step [93]) and the maximum correlation point falls within a correlation detection range (step [96]), the image displacement is calculated in step [100].

If NO in step [93], j=6 is set in step [94]. Then, the condition of step [95] is satisfied, and the flow goes to step [97]. If YES in step [88] or step [96], the flow goes to step [97]. At this time, it is apparent that the photo-taking lens is not near the in-focus position or the object contains only a spatial frequency component very close to the D.C. component.

For this reason, the data having the pitch $P'=2P$ and containing the D.C. component stored in the memory region (3) is selected. The maximum data amount lf is set to be $lf3 = N'/2$ ($N' = N/2$), and $Eth_4$ is set as the threshold value (step [97]). The algorithm processing as shown in FIG. 22 is performed (step [98]). If Infom = 1 and Correl = 1 (step [99]), the image displacement $X = Lm \times 2P$ is calculated based on the corresponding Lm and the pitch $P'=2P$ (step [100]). The defocus amount is calculated in step [100] in accordance with the result obtained in step [100]. If NO in step [99], detection cannot be performed and the flow ends.

In this embodiment, the a and b series primary data ai and bi having the spatial pitch Po are passed through the forward positioned filter means 65 shown in FIG. 16, sampled at the sampling pitch P=2Po, and stored in the memory region (1) of the microcomputer 68. The data stored in the memory region (1) is sampled at the sampling pitch $P'=2P=4Po$, and the sampled data is stored in a memory region (3). When the number of the a and b series primary data is respectively assumed to be 100, the a and b series data stored in the memory regions (1) and (3) respectively is about 50 and about 25. In this manner, since the number of data to be processed is determined in accordance with the various conditions, high-speed operation can be performed utilizing limited information.

Figure 28:
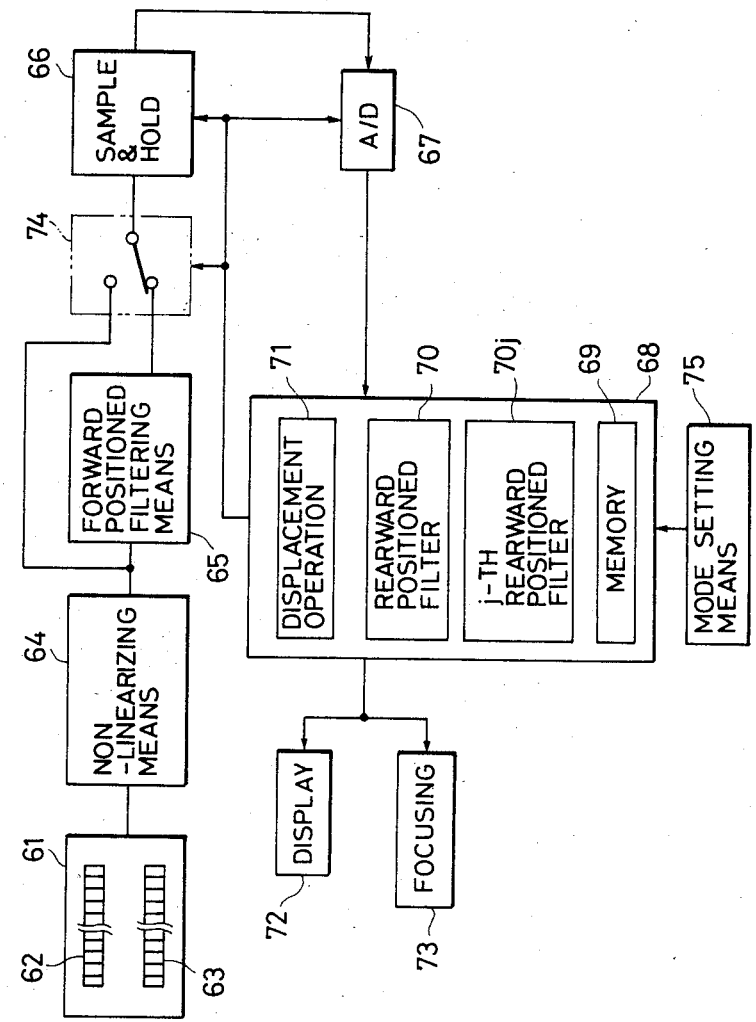
FIG. 28 is a block diagram showing a fifth embodiment of the present invention.

FIG. 28 shows the fifth embodiment of the present invention.

Referring to FIG. 28, a photoelectric device 61, a non-linearizing means 64, a forward positioned filter means 65, a sample & hold means 66, an A/D converter 67, a microcomputer 68, a display part 72 and a focusing part 73 are of the same configuration as those shown in FIG. 1. A switching means 74 is interposed between the forward positioned filter means 65 and the sample & hold means 66. The switching means 74 serves to select one of the outputs from the forward positioned filter means 65 and the non-linearizing means 64 and supplies the selected output to the sample & hold means 66. A mode setting means 75 is connected to the microcomputer 68 and can be set in one of first and second modes externally. In accordance with the set mode, the mode setting means 75 controls the switching means 74, the sample & hold means 66 and the A/D converter 67 through the microcomputer 68 in the following manner. When the switching means 74 is set in the first mode, it supplies the output (about 100 a and b series data respectively) from the forward positioned filter means 65 to the sample & hold means 66. The sample & hold means 66 samples the input data at the sampling pitch P=2Po and produces about 50 a and b series data, respectively. The A/D converter 67 performs A/D conversion of the data at the timing of the pitch 2Po. When the switching means 74 is set in the second mode, it supplies the 100 a and b series data respectively from the non-linearizing means 64 to the sample & hold means 66. Then the sample & hold means 66 samples at the sampling pitch P=Po the primary data ai and bi which respectively correspond to 50 elements at the center of the arrays 62 and 63, respectively. The sample & hold means 66 produces the 50 data for the a and b series data, and the A/D converter 67 performs the A/D conversion of the input data at the timing of the pitch Po. The relationships between the sampling pitch and the sampling region in the first mode with those in the second mode resemble those shown in FIGS. 10B and 10C.

Irrespective of the mode of the switching means 74, the microcomputer 68 processes the data received from the A/D converter 67 in accordance with one of the procedures of the first to fourth embodiments.

When the switching means 74 is set in the second mode, the primary data is supplied to the microcomputer 68 without the intermediary of the forward positioned filter means 65. Accordingly, the data in the second mode may contain an undesirable spatial frequency above the Nyquist frequency. However, if the pitch Po is very small, for example, about 50μ, such a problem can be eliminated for the following reason.

When the pitch is as small as 50μ, the spatial frequency components above the Nyquist frequency can be sufficiently removed from the primary data ai and bi due to the aberration of the focusing detection optical system and other reasons. Accordingly, even if the primary data is not passed through the forward positioned filter means 65 in the second mode, the detection precision may not be inadvertently degraded.

In the embodiments described above, the weighting-/adding processing and the displacement operation in the microcomputer are performed separately from each other. However, these two processings may be performed in a combined manner. For example, $A_i - B_{i+L}$ is calculated for a plurality of values of i and L, respectively, and the results are stored in a memory. The memory result can be used for the weighting/adding filtering and then the displacement operation may be performed thereafter. Furthermore, the weighting/adding processing and the displacement operation may be completely integrated as in the following equation:

$$C(L) = \Sigma |\{A_i - (A_{i-2} + A_{i+2})/2\} - \{B_{i+L} - (B_{i+L-2} + B_{i+L+2})/2\}|$$

In this case, the weighting coefficient series was $(-0.5, 1, -0.5)$.

Figure 29:
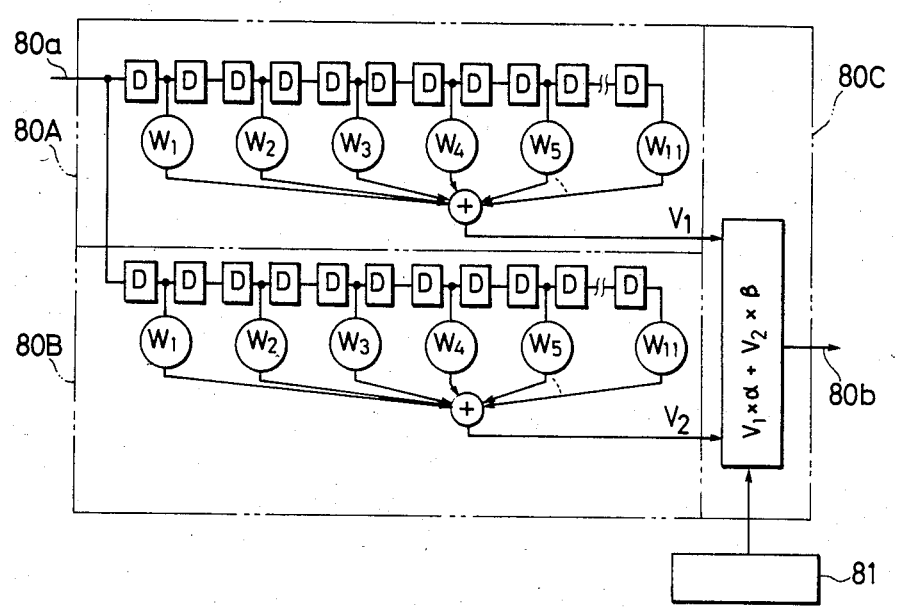
FIG. 29 is a block diagram showing another configuration of a combined filter.

There has been described combined filter means of forward and rearward filter means connected in series with each other to provide various MTF characteristics in FIGS. 16 and 28. FIG. 29 shows another combined filter means in which a pair of weighting/adding filters are connected in parallel with each other.

Referring to FIG. 29, primary data a1, b1, a2, b2, . . . , are sequentially supplied to an input terminal 80a of a combined filter means 80. As shown in FIG. 29, the combined filter means 80 comprises two filters 80A and 80B and a mixing means 80C. The two filters 80A and 80B have different MTF characteristics. The mixing means 80C multiplies an output V1 from the filter 80A with a coefficient α and an output V2 from the filter 80B with a coefficient β, and adds the products. That is, the mixing means 80C calculates $V1 \times \alpha + V2 \times \beta$, and produces the obtained sum from an output terminal 80b. A setting means 81 sets the values of the coefficients α and β in accordance with a command from the operator or information from a signal of the phototaking lens.

The function of the filter means 80 will now be described.

Figure 30A:
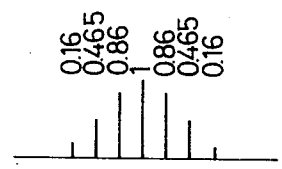
FIGS. 30A and 30B show examples of weighting coefficients of the combined filter shown in FIG. 29.
Figure 30B:
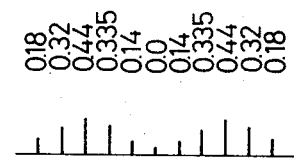
Figures 1, 31A:
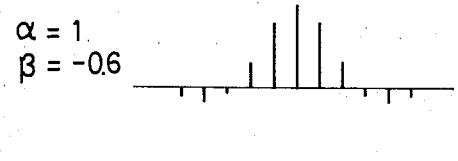
Figures 2, 31A:
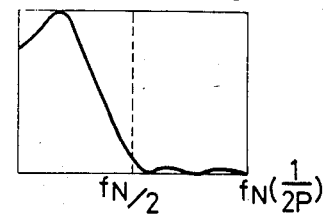
Figures 1, 31B:
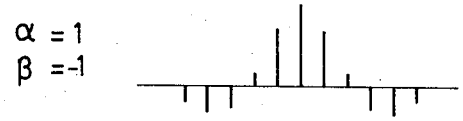
Figures 2, 31B:
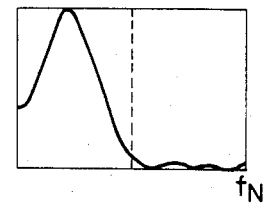
Figures 1, 31C:
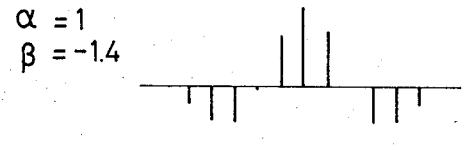
Figures 2, 31C:
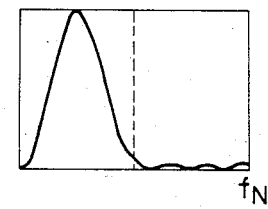
Figures 1, 31D:
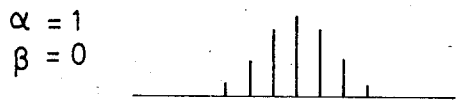
Figures 2, 31D:
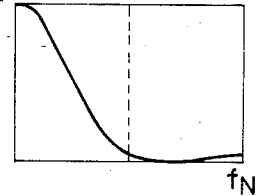
Figures 1, 31E:
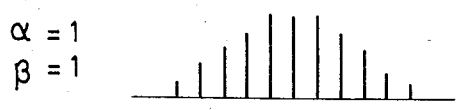
Figures 2, 31E:
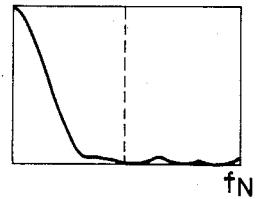

Assume that the respective filters 80A and 80B have the weighting coefficient series of (0, 0, 0.16, 0.465, 0.86, 1, 0.86, 0.465, 0.16, 0, 0) and (0.18, 0.32, 0.44, 0.335, 0.14, 0.0, 0.14, 0.335, 0.44, 0.32, 0.18), as shown in FIGS. 30A and 30B, respectively. When it is assumed that the values of the coefficients α and β are 1 and −0.6, respectively, the synthetic weighting coefficient series becomes as shown in FIG. 31A-1. The synthetic MTF characteristics, that is, the MTF characteristics of the filter means 80 become as shown in FIG. 31A-2 wherein Ao=0.75 Ap where MTF at zero frequency is Ao and MTF at peak frequency is Ap and there is a peak between the D.C. component and the frequency $f_N/2$. If it is assumed that $\alpha=1$ and $\beta=-1$, the synthetic weighting coefficient is as shown in FIG. 31B-1 and the synthetic MTF characteristics are as shown in FIG. 32B-2 wherein Ao≈0.4 Ap. If it is assumed that $\alpha=1$ and $\beta=-1.4$, the synthetic weighting coefficient and the synthetic MTF characteristics are as shown in FIGS. 31C-1 and 31C-2 wherein Ao=0. When it is assumed that $\alpha=1$ and $\beta=0$, the synthetic weighting coefficient and the synthetic MTF characteristics are as shown in FIGS. 31D-1 and 31D-2 wherein Ao=Ap. In this manner, desired MTF characteristics wherein Ao=0 to Ao can be obtained by suitably selecting the values of the coefficients α and β.

In the above description, the spatial frequency component which is above the Nyquist frequency $f_N=1/2P$ determined by the sampling pitch P and which is contained in the data used for the displacement operation is described as not desirable for the displacement operation, and the spatial frequency components at about half the Nyquist frequency are assumed to be very effective for high-precision displacement operation. The relationship between the displacement operation precision and the spatial frequency components will now be described.

FIGS. 32A-1 to 32F-1 show the states wherein periodic lattice images (hatched) having a spatial frequency of 3/4Po are moved in the direction indicated by arrows on photoelectric element arrays a1, a2, a3, a4, and a5 having a pitch Po. FIGS. 32A-2 to 32F-2 respectively show photoelectric outputs a1 to a5 corresponding to FIGS. 32A-1 to 32F-1, respectively. FIGS. 33A-1 to 33F-1 and FIGS. 33A-2 to 33F-2, FIGS. 4A-1 to 34F-1 and FIGS. 34A-2 to 34F-2, and FIGS. 5A-1 to 35F-1 and FIGS. 35A-2 to 35F-2 respectively correspond to periodic lattice images having spatial frequencies of 1/2Po, 3/8Po and 1/4Po, and are similar to FIGS. 32A-1 to 32F-1 and FIGS. 32A-2 to 32F-2.

As shown in FIGS. 32A-1 to 32F-1 and FIGS. 2A-2 to 32F-2, for a lattice image having a spatial frequency 3/4Po 1.5 times the Nyquist frequency 1/2Po, the direction of movement of the image and the direction of the resultant movement of the photoelectric output pattern are opposite to each other. In general, in a lattice image having a spatial frequency falling within the range between the Nyquist frequency $f_N$ and the frequency $2f_N$, the direction of movement of the image is opposite to the phase change of the photoelectric output pattern. Referring to FIGS. 33A-1 to 33F-1 and FIGS. 33A-2 to 33F-2, in a lattice image having a spatial frequency 1/2Po which is equal to the Nyquist frequency, upon movement of the image only the amplitude of the photoelectric output pattern changes and the phase of the photoelectric output pattern does not change. Referring to FIGS. 34A-1 to 34F-1 and FIGS. 34A-2 to 34F-2, in a lattice image having a spatial frequency 3/8Po which is 3/4 of the Nyquist frequency, upon movement of the image in the direction indicated by the arrow, the phase of the photoelectric output pattern changes but such a change in the phase is not smooth. Referring to FIGS. 35A-1 to 35F-1 and FIGS. 35A-2 to 35F-2, in a lattice image having a spatial frequency 1/4Po which is ½ Nyquist frequency, upon movement of the image in the direction indicated by the arrow, the phase of the photoelectric output pattern also changes in the same direction and smoothly.

A conventional light-receiving array (a generic term including, for example, the small lens array 2 shown in FIG. 1 or the photoelectric element arrays 22 and 23 shown in FIG. 8) has the characteristics as shown in FIG. 17A wherein the MTF gradually decreases from the D.C. component and becomes zero near a frequency 1/Po. This array therefore extracts an undesirable spatial frequency component above the Nyquist frequency 1/2Po determined by the pitch Po. In view of this, the characteristics of a weighting/adding filter which can satisfactorily remove the component above the Nyquist frequency from the photoelectric output data from such a light-receiving array will be described below.

Figure 36A:
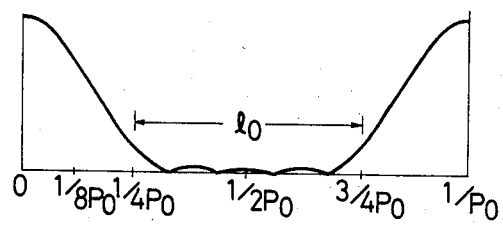
FIGS. 36A and 36B are a graph showing the MTF characteristics and a view showing a weighting coefficient series to give such MTF characteristics, respectively.
Figure 36B:
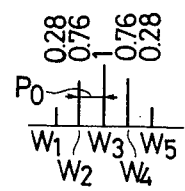

FIG. 36A shows the MTF characteristics of a filter having the weighting coefficient series as shown in FIG. 36B. These characteristics are symmetrical with respect to the frequency 1/2Po; the MTF gradually decreases from the D.C. component, becomes very small around the frequency of 1/4Po, remains sufficiently small up to a frequency of about 3/4Po, and then increases. In this manner, since the MTF of the filter is sufficiently sxall within the range of 1/4Po to 3/4Po denoted by lo and the MTF of the photoelectric array is sufficiently small at a frequency of about 1/Po or higher, the synthetic MTF of the array and the filter as shown in FIG. 36B is obtained from which the frequency components above the Nyquist frequency 1/2Po deterxined by the pitch Po and the Nyquist frequency 1/4Po determined by the pitch 2Po are removed.

Figure 37A:
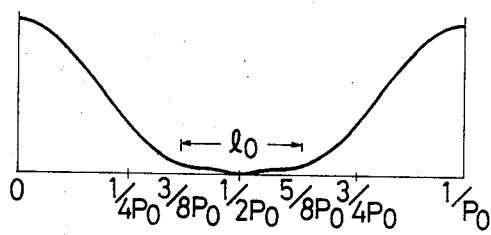
FIGS. 37A and 37B, FIGS. 38A and 38B, and FIGS. 39A and 39B are graphs and views similar to FIGS. 36A and 36B.
Figure 37B:
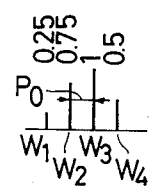
Figure 38A:
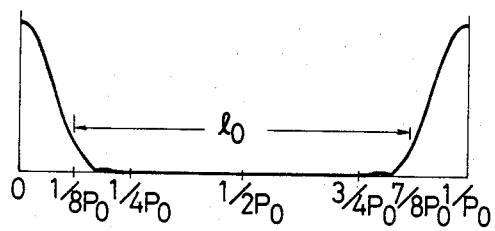
Figure 38B:
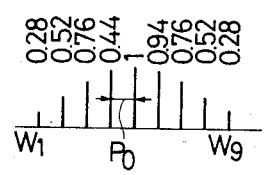

The MTF characteristics of the filter having the weighting coefficient series as shown in FIG. 37B are as shown in FIG. 37A wherein the frequency 1/2Po is the center frequency and MTF suppressing region lo is 3/8Po to 5/8Po. Although the MTF suppressing region lo of this filter means is narrower than that of the filter shown in FIG. 36A, it is capable of suppressing to a substantially satisfactory degree the high spatial frequency components above the frequency 1/2Po together with the MTF characteristics of the light-receiving array. In the filter means as shown in FIGS. 38A and 38B, since the MTF suppressing region lo is as wide as 1/8Po to 7/8Po, if the Nyquist frequency is determined to be 1/2Po, the effective frequency components of 1/8Po to 1/2Po are suppressed too much. Accordingly, in this case, the sampling pitch is suitably selected so that the Nyquist frequency becomes 1/4Po or 1/8Po.

The filter means according to the present invention which eliminate frequency components above Nyquist frequency must satisfy the following conditions. That is, the number of weighting coefficients which are not zero must exceed 4, the MTF characteristics must be sufficiently small within a frequency range lo of at least 3/8Po to 5/8Po, and the MTF gradually increases from the lower limit of this range toward the lower frequencies. If the number of weighting coefficients is less than 4, it is difficult to atain the frequency range lo as described above. When the frequency range lo is narrower than that as described above, suppression of the frequency components above a frequency 1/2Po by the MTF characteristics of the light-receiving array becomes extremely difficult. When n of the sampling pitch nPo is 2 or more, the frequency range lo must be 3/4nPo to (1/Po−3/4nPo) or more and is preferably 1/2nPo to (1/Po−1/2nPo) or more. The lower limit 3/4nPo of the frequency range lo is equivalent to 3/2 times the corresponding Nyquist frequency 1/2nPo. When the lower limit is higher than the value 3/4nPo, the adverse effect of the component from the Nyquist frequency to the lower limit becomes non-negligible.

In the above description, the conditions for the MTF characteristics of the filter means in the frequency range above the Nyquist frequency determined by the sampling pitch are explained. Conditions for the MTF characteristics of the filter means in the frequency range below the Nyquist frequency will now be described.

Figure 40A:
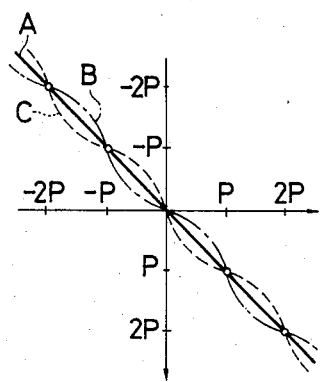
FIGS. 40A and 40B are graphs showing the relationship between the displacement amount of an optical image and a detection amount corresponding thereto.
Figure 41A:
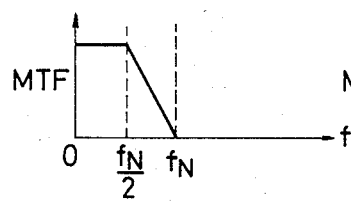
FIGS. 41A and 41B are graphs showing the MTF characteristics.
Figure 41B:
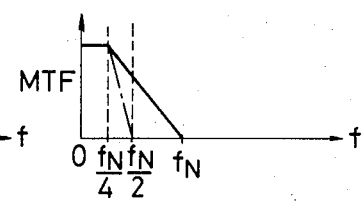

FIG. 40A shows a graph wherein the relative displacement between the object images on a pair of light-receiving arrays is plotted along the axis of abscissa, and the displacement detected by the focus detection apparatus is plotted along the axis of ordinate. A solid curve (A) corresponds to an ideal case wherein the image displacement and the detected displacement coincide with each other. An alternate long and short dashed curve (B) and a broken curve (C) correspond to cases of conventional focus detection apparatus. The curves (B) and (C) intersect with the curve (A) at integer multiples of the sampling pitch P. Accordingly, if the image displacement is equal to an integer multiple of the sampling pitch P, it may be correctly detected. However, if the image displacement is not equal to an integer multiple of the sampling pitch P, it cannot be correctly detected and an error is caused. Such an error is caused when the frequency component used for displacement detection/operation contains a component higher than the Nyquist frequency or even when only the frequency component below the Nyquist frequency is used. This is attributed to the following reason. At a frequency near the Nyquist frequency $f_N$ within the frequency range $f_N/2$ to $f_N$, the phase change in the photoelectric output upon a movement of the images is not smooth as shown in FIGS. 34A-1 to 34F-2. For this reason, when the frequency component near the Nyquist frequency $f_N$ within the frequency range $f_N/2$ to $f_N$ is used for focus detection, an increased error is generated for an image displacement which is not equal to an integer multiple of the sampling pitch as shown in FIG. 40A. The non-smoothness of the phase change in the photoelectric output pattern within the frequency range $f_N/2$ to $f_N$ is more significant with a higher frequency within this frequency range. Accordingly, the MTF characteristics of the filter means below the Nyquist frequency are preferably as shown in FIG. 41A wherein the MTF is sufficiently small near the Nyquist frequency $f_N$, gradually increases with a decrease in the frequency, and is sufficiently large at a frequency smaller than the frequency $f_N/2$. Although the MTF must take a sufficiently large value when the frequency is about $f_N/2$, it preferably takes a sufficiently large value within the frequency from about $f_N/2$ to $f_N/4$ considering effective use of information. The solid curve shown in FIG. 41B shows a case wherein the MTF is sufficiently large at a frequency of $f_N/4$. In the two MTF characteristic curves described above, the point at which the MTF starts to increase gradually, that is, the leading point is near the Nyquist frequency. However, such a leading point may be shifted toward a higher frequency or to a lower frequency. When such a shift to a lower frequency is great, the frequency component falling within the frequency range of $f_N/2$ to $f_N$ which results in non-smooth phase change in the photoelectric output pattern can be eliminated in a more efficient manner. However, at the same time, this also results in the problem of elimination of the effective data as well. Considering the elimination of the frequency component which results in non-smooth phase change and the elimination of the effective information, the lower limit of the frequency at which the MTF rises is preferably about $f_N/2$ as indicated by the alternate long and short dashed curve. According to the MTF characteristics indicated by the alternate long and short dashed curve, the MTF is sufficiently small in a frequency range below about $f_N/2$, gradually increases from about $f_N/2$, and is sufficiently large near $f_N/4$. Accordingly, the frequency component within a frequency range which causes non-smooth phase change in the photoelectric output pattern is mostly eliminated.

Figure 39A:
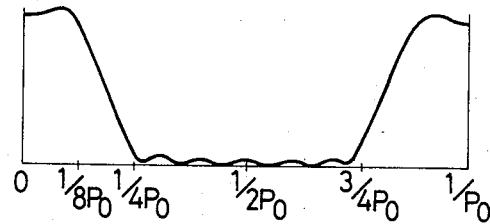
Figure 39B:
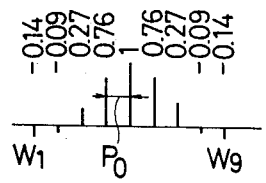

A filter means having the MTF characteristics as shown in FIG. 41A can be obtained using the weighting coefficients as shown in FIG. 39B and sampling pitch P=2Po, $f_N$ is 1/4Po. The MTF characteristics indicated by the alternate long and short dashed curve in FIG. 41B correspond to those shown in FIG. 39A wherein $f_N$ is 1/2Po.

Figure 40B:
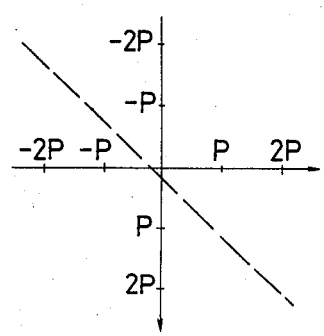

When a photo-taking lens is replaced with another, and when part of the images on the pair of photoelectric element arrays causes an vignetting or the amplification factor of the arrays is non-uniform, a curve representing a detected image displacement does not pass the origin of the coordinate system and erratic focus detection is caused, as shown in FIG. 40B. In order to eliminate such an error, the component near a zero frequency must be eliminated.

A weighting/adding filter is described below wherein zero spatial frequency component is eliminated, the component higher than the Nyquist frequency is also eliminated, the MTF peak value falls within a range of $f_N/4$ to $f_N/2$, and the MTF at a frequency of $(\frac{3}{4})f_N$ is less than half the MTF peak.

Figure 42A:
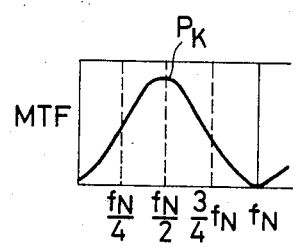
Figure 42B:
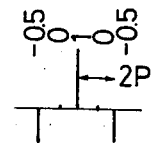
Figure 43A:
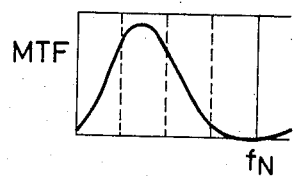
Figure 43B:
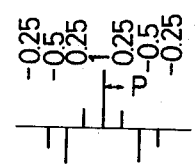
Figure 44A:
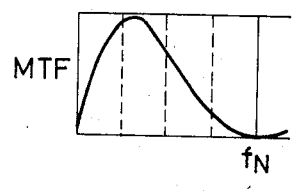
Figure 44B:
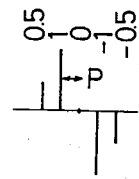
Figure 45A:
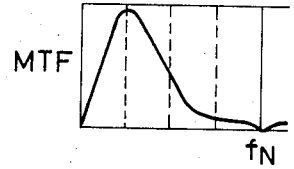
Figure 45B:
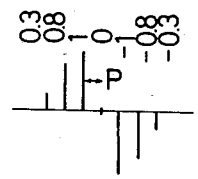

FIG. 42B shows the weighting coefficient series (−0.5, 1, −0.5) for the input data having the pitch P, that is, the series (−0.5, 0, 1, 0, −0.5) of the pitch P. FIG. 42A shows the MTF characteristics of a filter having such a series, wherein the MTF peak value Pk is at $f_N/2$ (=1/4P) and the MTF value at the frequency $(\frac{3}{4})f_N$ is half the peak value Pk. FIGS. 43A to 45A and FIGS. 43B to 45B show a filter wherein the number of weighting coefficients is 4 or more, the MTF peak value is obtained at a frequency lower than the frequency $f_N/2$, and the MTF within a wide range near the Nyquist frequency is sufficiently small.

In FIGS. 42B to 45B, the number of weighting coefficients must be 3 or more. However, when the number of weighting coefficients is small, the configuration of the filter can be simplified accordingly. In view of this, the conditions to be satisfied when the number of weighting coefficients is 3 are described below. The first condition is that weighting coefficients W1, W2 and W3 must be multiplied with every other input data, that is, the pitch of the weighting coefficients W1, W2 and W3 must be twice pitch P of the input data.

The first condition must be satisfied if the input data contains a component near the Nyquist frequency. Accordingly, if the input data is free from such a component near the Nyquist frequency, the pitch of the weighting coefficient series can be P.

The second condition is that the sum of the three weighting coefficients W1, W2 and W3 is substantially zero.

The third condition is that the weighting coefficients W1 and W3 have the same sign, and the coefficient W2 and the coefficients W1 and W3 have opposite signs.

It will be apparent that the coefficient series shown in FIG. 39B satisfies these three conditions.

In order to render zero the MTF at the D.C. component and the Nyquist frequency, the sum must be definitely zero. However, if the MTF must be substantially zero, the sum need only be substantially zero.

In this manner, when the component at a frequency of zero is completely eliminated, information required for focus detection is substantially eliminated for images containing mainly low spatial frequency components, so that the focus detection is disabled or detection precision is extremely lowered.

In order to solve this problem, the filter must have the MTF characteristics wherein the MTF Ao at the zero frequency is 0.1 to 0.8 times the MTF peak Ap. Preferably, the MTF Ao at the zero frequency is 0.2 to 0.7 times the Ap. Such MTF characteristics, strictly speaking, are not those of a single filter but are synthetic MTF characteristics of the filter and those of the light-receiving array.

The configuration of the filter having such MTF characteristics will now be described.

Figure 46A:
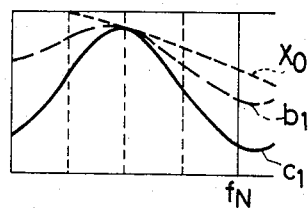
Figure 46B:
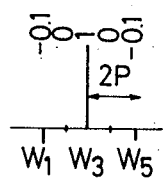
Figure 46C:
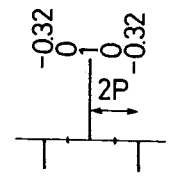
Figure 47A:
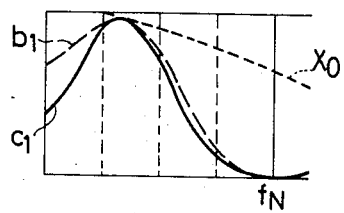
Figure 47B:
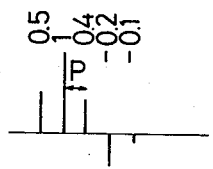
Figure 47C:
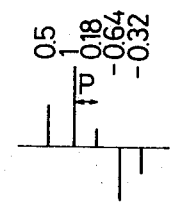
Figure 48A:
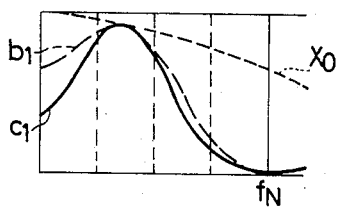
Figure 48B:
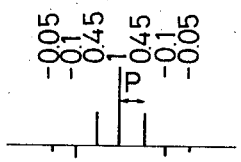
Figure 48C:
Figure 49A:
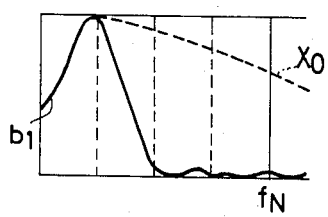
Figure 49B:
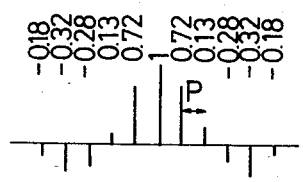

Referring to FIG. 46A, a dotted curve Xo shows the MTF characteristics which are determined by the shape of the light-receiving array. The MTF characteristics represented by a broken curve b1 are synthetic MTF characteristics for the weighting coefficient series (−0.1, 1, −0.1) for the pitch P shown in FIG 46B and those of the light-receiving array. According to these synthetic MTF characteristics, the MTF at the zero frequency is 0.74 times the MTF peak value. When the weighting coefficient series as shown in FIG. 46C is used, the synthetic MTF characteristics as indicated by a solid curve C1 in FIG. 46A are obtained. FIGS. 47A, 7B and 47C, FIGS. 48A, 48B and 48C, and FIGS. 49A, 49B and 49C show cases wherein 5, 7 and 11 weighting coefficients are used, respectively.

The weighting coefficient series is preferably symmetrical with respect to a central coefficient so that the filtering effect may not be dependent on the illuminance distribution of the images, as shown in FIGS. 43B, 43C, 45B, 45C and 46B.

For these reasons and the problems of symmetry, a filter which is capable of eliminating the data having the sampling pitch P and the D.C. component and of effectively extracting high spatial frequency components of up to $f_N/2 = 1/4P$ preferably has the weighting coefficient series shown in FIGS. 46B, 46C, 48B and 48C.

The conditions for three symmetrical weighting coefficients W1, W2 and W3 to satisfy the MTF chracteristics as described above; ① 0.1Ap<Ao<0.8Ap and ② 0.2Ap<Ao<0.7Ap will be described below.

When it is assumed that W2=1 and W1=W3=x (negative value), the D.C. component extraction efficiency Ao and the peak extraction efficiency Ap' of the filter hold the following relationship:

Ao={(1+2x)/(1−2x)}Ap'

The maximum extraction efficiency Ap of the synthetic MTF characteristics is obtained as Ap=γ·Ap' (where γ is a value determined by the shape of the light-receiving array). The efficiency Ap and the maximum extraction efficiency Ap hold the following relation:

Ao={(1+2x)/(1−2x)}(1/γ)Ap

When this is substituted in the relation ② above, we have:

0.1<{(1+2x)/(1−2x)}(1/γ)<0.8 x can then be obtained as:

−1/2{(10+γ)}<x<−(1/2){(10−8γ)/(10+8γ)}

The value of $\gamma$ based on the MTF characteristics and determined by the shape of the light-receiving array generally satisfies the relation:

$$1 \equiv \gamma \equiv 0.9$$

Therefore, we have:

$$-0.41 < x < -0.06 \text{ for } \gamma = 1$$

$$-0.42 < x < -0.08 \text{ for } \gamma = 0.9$$

When Ap is substituted in the relation ② above to solve it for x, we have:

$$-(1/2)\{(10-2\gamma)/(10+2\gamma)\} \leq x \leq -(1/2).$$

Therefore, $$-0.33 \leq x \leq -0.09 \text{ for } \gamma = 1$$

$$-0.35 \leq x \leq -0.11 \text{ for } \gamma = 0.9$$

I claim:

1. A focus detection apparatus for detecting a focusing state of an imaging optical system comprising:
   (1) optical means for forming a first image and a second image of an object with light passing through said imaging optical system, relative displacement between said first and second images varying in response to said focusing state of said imaging optical system,
   (2) generating means for generating a series of first electric signals and a series of second electric signals each of which represents an illumination distribution pattern of said first image and an illumination distribution pattern of said second image, respectively, said first and second electric signals being image data with respect to a spatial pitch P,
   (3) memory means connected to said generating means for storing said first and second electric signals,
   (4) operation means connected to said memory means for filtering said first and second signals stored in said memory means with MTF characteristics suppressing a spatial DC component to generate third and fourth electric signals, for calculating, from said third and fourth electric signals, a first relative displacement amount between said first and second images, and for calculating, from said first and second electric signals stored in said memory means and not subjected to any filtering process inclusive of the filtering of said operation means, a second relative displacement amount between said first and second images.

2. A focus detection apparatus according to claim 1 wherein said generating means includes first and second photoelectric element arrays, each of said arrays including a plurality of photoelectric elements arranged at said pitch P, and wherein said MTF characteristics have a peak of MTF value located near a spatial frequency ¼P, the MTF value gradually decreasing as spatial frequencies depart from said spatial frequency ¼P.

3. An apparatus comprising:
   (1) an imaging optical system for forming an image of an object;
   (2) array means including a plurality of photoelectric elements disposed to receive light passed through said imaging optical system, said array means producing a series of primary data associated with photoelectric outputs of said photoelectric elements;
   (3) first filter means for filtering said primary data to generate a series of secondary data;
   (4) second filter means for filtering said secondary data to generate a series of tertiary data; and
   (5) operation means for operating upon said tertiary data to generate an output which represents a focusing state of said imaging optical system, and wherein said array means includes first and second photoelectric element arrays, said first array including a plurality of photoelectric elements for receiving light passing through a portion of said imaging optical system to generate a series of photoelectric outputs serving as a part of said primary data, said second array including a plurality of photoelectric elements for receiving light passing through another portion of said imaging optical system to generate another series of photoelectric outputs serving as another part of said primary data.

4. An apparatus according to claim 3, wherein said operation means further operates upon said secondary data to generate a further output which represents a focusing state of said imaging optical system.

5. An apparatus according to claim 3, further comprising sampling means for sampling said secondary data at sampling pitch P=nPo, where n is a natural number and Po is a spatial pitch of said primary data, and wherein said second filter means filters said sampled secondary data from said sampling means.

6. An apparatus according to claim 5, wherein said first filter means has MTF characteristics suppressing the spatial frequency components above Nyquist frequency determined by said sampling pitch P.

7. An apparatus according to claim 6, wherein said second filter means has MTF characteristics suppressing a spatial D.C. component.

8. An apparatus according to claim 7, wherein said second filter means has MTF characteristics mainly extracting spatial frequency components near a half of said Nyquist frequency.

9. An apparatus comprising:
   (1) an imaging optical system for forming an image of an object;
   (2) array means including a plurality of photoelectric elements disposed to receive light passed through said imaging optical system, said array means producing a series of primary data associated with photoelectric outputs of said photoelectric elements;
   (3) first filter means for filtering said primary data to generate a series of secondary data;
   (4) second filter means for filtering said secondary data to generate a series of tertiary data; and
   (5) operation means for operating upon said tertiary data to generate an output which represents a focusing state of said imaging optical system, and wherein said second filter means includes a plurality of filters which have different MTF characteristics, said filters being alternatively selected to filter said secondary data.

10. A focus detection apparatus for detecting a focusing state of an imaging optical system comprising:
    (1) first and second photoelectric element arrays, each of said arrays including a plurality of photoelectric elements arranged at a pitch Po;

(2) optical means for forming first a image of an object on said first array and forming a second image of said object on said second array, said first array generating a series of first signals which represent said first image, said second array generating a series of second signals which represent said second image;

(3) first filter means for filtering said first and second signals, said first filter means having MTF characteristics with a peak of MTF value being located near a spatial frequency 1/4Po, the MTF value gradually decreasing as spatial frequencies depart from said spatial frequency 1/4Po;

(4) second filter means for filtering said first and second signals, said second filter means having MTF characteristics with MTF values being greater than those of said first filter means in a frequency region lower than about said frequency 1/4Po;

(5) operation means for generating, based on first and second signals filtered by said first filter means, a first output which represents a focusing state of said imaging optical system and for generating, based on first and second signals filtered by said second filter means, a second output which represents said focusing state.

11. A focus detection apparatus according to claim 10, further comprising:
selection means for alternatively selecting said first output and said second output, and
means responsive to one of said first and second outputs selected by said selection means for effecting at least one of display operation of said focusing state and driving operation for driving said imaging optical system to an infocus position.

12. An apparatus according to claim 11, wherein said selection means selects said second output when a displacement amount between said first and second images is above a predetermined value and said first output when said displacement amount is below said predetermined value.

13. An apparatus according to claim 10, wherein said second filter means has MTF characteristics sufficiently extracting a D.C. component and suppressing frequency components near said spatial frequency 1/4Po.

14. An apparatus according to claim 10, wherein said second filter means has MTF characteristics with the peak of MTF value being located between frequency zero and frequency 1/4Po.

15. A focus detection apparatus for detecting a focusing state of an imaging optical system comprising:
(1) optical means for forming a first image and a second image of an object with light passing through said imaging optical system, relative displacement between said first and second image varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) first filter means for filtering said first and second electric signals, said first filtering means having MTF characteristics with a peak of MTF value being located near a spatial frequency 1/4P;

(4) second filter means for filtering said first and second electric signals, said second filtering means having MTF characteristics substantially suppressing spatial frequency components higher than said spatial frequency 1/4P; and (5) producing means for producing a first output representing said focusing state in accordance with said first and second electric signals filtered by said first filter means, and for producing a second output representing said focusing state in accordance with said first and second electric signals filtered by said second filter means.

16. An apparatus according to claim 15, further comprising
third filter means for filtering said first and second electric signals, said third filter means having MTF characteristics with a peak of MTF value being located near a spatial frequency 1/8P,
and wherein said producing means further producing a third output representing said focusing state in accordance with said first and second electric signals filtered by said third filter means.

17. An apparatus according to claim 15, further comprising:
sampling means for sampling said first and second electric signals filtered by said second filter means at a sampling pitch 2P;
discriminating means for discriminating whether said output of said producing means is available or not; and
means for causing said producing means to produce said first output in accordance with said first and second electric signals filtered by said first filter means, for causing said discriminating means to discriminate whether said first output is available or not, and for further causing said producing means to produce said second output in accordance with said first and second electric signals filtered by said second filter means and sampled by said sampling means when said discriminating means discriminates said first output to be unavailable.

18. A focus detection apparatus for detecting a focusing state of an imaging optical system comprising
(1) optical means for forming a first image and a second image of an object with light passing through said imaging optical system, relative displacement between said first and second images varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) filter means for filtering said first and second electric signals, said filter means having MTF characteristics suppressing a spatial D.C. component;
(4) producing means for producing a first focus detection signal representing said focusing state in accordance with said first and second electric signals filtered by said filter means, and for producing a second focus detection signal in accordance with said first and second electric signals not filtered by said filter means;
(5) discriminating means for discriminating whether said imaging optical system is close to an in-focus position or not in accordance with said focus detection signal; and (6) causing means for causing said producing means to produce said second focus detection signal in accordance with said first and second electric signals not filtered by said filter means, and for causing said producing means to produce said first focus detection signal in accordance with said first and second electric signals filtered by said filter means when said discriminating means discriminates said imaging optical system to be close to said in-focus position.

19. An apparatus according to claim 18, wherein said filter means has MTF characteristics sufficiently extracting spatial frequency components near a spatial frequency 4P.

20. An apparatus according to claim 19,
further comprising additional filter means for filtering said first and second electric signals, and having MTF characteristics different from MTF characteristics of said filter means,
and wherein said causing means causes said producing means to produce a third focus detection signal in accordance with said first and second electric signals filtered by said additional filter means.

21. A focus detection apparatus for detecting a focusing state of an imaging optical system comprising:
(1) optical means for forming a first image and a second image of an object with light passing through said imaging optical system. relative displacement between said first and second images varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) filter means for filtering said first and second electric signals, said filter means having MTF characteristics suppressing a spatial D.C. component;
(4) displacement amount detecting means for detecting a relative displacement amount between said first and second images in accordance with said first and second electric signals filtered by said filter means and in accordance with said first and second electric signals not filtered by said filter means, respectively;
(5) setting means for setting maximum displacement amount detectable for said displacement amount detecting means; and
(6) selecting means for selecting first or second mode,
in said first mode said setting means setting said maximum displacement amount relatively small and said displacement amount detecting means detecting said relative displacement amount in accordance with said first and second electric signals filtered by said filter means, and
in said second mode said setting means setting said maximum displacement amount relatively large and said displacement amount detecting means detecting said relative displacement amount in accordance with said first and second electric signals not filtered by said filter means,
said selecting means selecting said second mode from said first mode when in said first mode said displacement amount detecting means is unable to detect said relative displacement amount within said detectable maximum displacement amount.

22. An apparatus according to claim 21, wherein said filter means has MTF characteristics sufficiently extracting spatial frequency components near a spatial frequency 1/4P.

23. An apparatus according to claim 21, further comprising:
a discriminating means for discriminating whether said relative displacement amount detected by said displacement amount detecting means is reliable or not,
and wherein said selecting means selects said second mode from said first mode when in said first mode said relative displacement amount is detected within said maximum displacement amount by said displacement amount detecting means and said discriminating means discriminates said relative displacement amount to be unreliable.

24. An apparatus according to claim 22, further comprising:
an additional filter means for filtering said first and second electric signals and having MTF characteristics different from MTF characteristics of said filter means,
and wherein said displacement amount detecting means, in said second mode, detects said relative displacement amount in accordance with said first and second electric signals filtered by said additional filter means.

25. A focus detection apparatus for detecting a focusing state of an imaging optical system comprisiing:
(1) Optical means for forming a first image and a second image of an object with light passing through said imaging optical system, relative displacement between said first and second images varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) first and second filter means for filtering said first and second electric signals,
said first and second filter means both having MTF characteristics suppressing a D.C. component,
a peak frequency corresponding to a peak of MTF value of said first filter means being higher than that of said second filter means;
(4) displacement amount detecting means for detecting a relative displacement amount between said first and second images in accordance with said first and second, electric signals filtered by said first filter means and for detecting said amount in accordance with said first and second electric signals filtered by said second filter means, respectively;
(5) causing means for causing said displacement amount detecting means to detect said relative displacement amount in accordance with said first and second electric signals filtered by said first filter means, and then causing said displacement amount detecting means to detect said relative displacement amount in accordance with said first and second electric signals filtered by said second filter means.

26. An apparatus according to claim 25, further comprising:
means for inhibiting detection of said relative displacement amount in accordance with said first and second electric signals filtered by said second filter means when said relative displacement amount is detected by said displacement amount detecting means in accordance with said first and second electric signals filtered by said first filter means.

27. An apparatus according to claim 26, wherein said peak frequencies of said first and second filter means are about 1/4P and 1/8P, respectively, where P is a spatial pitch of said first and second electric signals used for detection of said relative displacement amount by said displacement amount detecting means.

28. A focus detection apparatus for detecting a focusing state of an imaging optical system comprising:
(1) first and second photoelectric element arrays, each of said arrays including a plurality of photoelectric elements arranged at a pitch Po;
(2) optical means for forming a first image of an object on said first array and forming a second image of said object on said second array, said first array generating a series of first signals which represent said first image, said second array generating a series of second signals which represent said second image;
(3) first filter means for filtering said first and second signals, said first filter means having MTF characteristics with spatial frequency components above frequency 1/2mPo being sufficiently suppressed;
(4) first sampling means for sampling at sampling pitch mPo, said first and second signals filtered by said first filter means,
(5) second filter means for filtering said first and second signals, said second filter means having MTF characterisitcs with spatial frequency components above frequency 1/2nPo being sufficiently suppressed;
(6) second sampling means for sampling, at a sampling pitch nPo, said first and second signals filtered by said second filter means, where "n" is an integer equal to 2 or more, "m" being an integer more than "n";
(7) operation means for generating, based on first and second signals sampled by said first sampling means, a first output which represents a focusing state of said imaging optical system and for generating, based on first and second signals sampled by said second sampling means, a second output which represents said focusing state.

29. An apparatus according to claim 28, further comprising:
selection means for alternatively selecting sa first output and said second output, and
means responsive to one of said first and second outputs selected by said selection means for effecting at least one of display operation of said focusing state and driving operation for driving said imaging optical system to an in-focus position.

30. An apparatus according to claim 29, wherein said selection means selects said first output when a displacement amount between said first and second image is above a predetermined value and said second output when said displacement amount is below said predetermined value.

31. An apparatus according to claim 28, wherein said second filter means has MTF characteristics with a peak of MTF value being located near a frequency 1/4nPo.

32. An apparatus comprising:
(1) an imaging optical system;
(2) optical means for forming a first image and a second image of an object with light passing through said imaging optical system;
(3) generating means for generating a series of first electric signals and a series of second electric signals each of which represents an illumination distribution pattern of said first image and an illumination distribution pattern of said second image, respectively,
said first and second electric signals being image data with respect to a spatial pitch P;
(4) filter means for filtering said first and second electric signals, said filter means suppressing spatial frequency components higher than a frequency 1/2nP, where n is an integer greater than or equal to 2;
(5) sampling means for sampling, at a sampling pitch nP, said first and second electric signals filtered by said filter means; and
(6) producing means for producing a first output which represents a relative displacement amount between said first and second images in accordance with said first and second electric signals with said spatial pitch P, and for producing a second output which represents said relative displacement amount in accordance with said first and second electric signals sampled by said sampling means.

33. An apparatus according to claim 32, further comprising selecting means for alternatively selecting said first or second output by manual operation.

34. A focus detection apparatus for detecting a focusing state of an imaging optical system comprising:
(1) Optical means for forming a first image and second image of an object with light passing through said imaging optical system, relative displacement between said first and second images varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) first filter means for filtering said first and second electric signals so as to substantially suppress spatial frequency components higher than a frequency 1/4P;
(4) first sampling means for sampling, at a sampling pitch 2P, said first and second electric signals filtered by said first filter means;
(5) second filter means for filtering said first and second electric signals sampled by said first sampling means so as to suppress high spatial frequency components of said first and second electric signals;
(6) second sampling means for sampling, at a sampling pitch 4P, said first and second electric signals filtered by said second filter means; and
(7) producing means for producing an output in accordance with said first and second electric signals sampled by said first sampling means, and for producing an output in accordance with said first and second electric signals sampled by said second sampling means, each of said outputs representing said focusing state.

35. An apparatus comprising:
(1) a light-receiving array including a plurality of light-receiving portions disposed at a pitch Po, each of of said light-receiving portions producing an electric output associated with an intensity of incident light thereto;
(2) an imaging optical system forming an image of an object on said light-receiving array;
(3) filter means for multiplying each of said electric outputs of more than 4 of said light-receiving elements adjacent to each other by a predetermined weighting coefficient, for adding said weighted electric outputs, and for producing said added output at every pitch nPo, where n is a natural number,
said filter means having MTF characteristics in which MTF values are sufficiently small at least for a spatial frequency band ranging from 3/8Po to 5/8Po and gradually increase as the spatial frequency decreases from a spatial frequency 3/8Po to a predetermined spatial frequency where the MTF value is sufficiently large.

36. An apparatus according to claim 35, wherein said spatial frequency band ranges from about 1/4Po to about 3/4Po.

37. An apparatus according to calim 35, wherein n is an integer greater than or equal to 2, said spatial frequency band ranges from 3/4nPo to (1/Po−3/4nPo), and said predetermined spatial frequency is less than 1/4nPo.

38. An apparatus comprising:
(1) an optical system for forming a first image and a second image of an object;
(2) generating means including a plurality of light-receiving portions disposed at a pitch Po and for generating a series of first electric signals and a series of second electric signals each being associated with said first image and second image, respectively, said first and second electric signals being image data with respect to a spatial pitch P; and
(3) filter means for receiving and filtering said first and second electric signals,
MTF characteristics synthesized from MTF characteristics of said filter means and MTF characteristics determined by configurations of said light-receiving portions satisfying $0.1 Ap < Ao < 0.8 Ap$, where Ao is a value of said synthesized MTF at zero frequency and Ap is a maximum value of said synthesized MTF.

39. An apparatus according to claim 38, wherein said synthesized MTF characteristics satisfies $0.2 Ap < Ao < 0.7 Ap$.

40. An apparatus according to claim 38, wherein said spatial pitch P is equal to Po.

41. An apparatus according to claim 38, wherein said filter means multiplies said plural electric signals by three non-zero weighting coefficients $W_1$, $W_2$ and $W_3$ and then adds said weighted electric signals, weighting coefficients $W_1$ and $W_3$ being of the same sign and substantially equal to each other, and $W_2$ having an opposite sign to $W_1$, said weighting coefficients $W_1$, $W_2$ and $W_3$ are multiplied to said electric signals at every pitch 2P.

42. An apparatus comprising:

(1) an imaging optical system for forming an image of an object;
(2) means for obtaining a series of electric signals $a_1$, $a_2$, $a_3$, ... from said image;
(3) first and second weighting/adding filter means for receiving and filtering said series of electric signals $a_1$, $a_2$, $a_3$, ... ,
said first filter means performing a weighting/adding operation $$A^1{}_i = \sum_{j=1}^{m} a_{i+j} \times W_j$$

on said received electric signals $a_1$, $a_2$, $a_3$, ... , thereby producing outputs $A^1{}_i$,
said second filter means performing a weighting/adding operation $$A^2{}_i = \sum_{j=1}^{s} a_{i+j} \times M_j$$

on said received electric signals $a_1$, $a_2$, $a_3$, ..., thereby producing outputs $A^2{}_i$,
a progression of weighting coefficients $W_1$, $W_2$, ..., $W_m$ for said first filter means being different from a progression of weighting coefficients $M_1$, $M_2$, ..., $M_s$ for said second filter means; and
(4) operating means for multiplying said output $A^1{}_i$ of said first filter means and said output $A^2{}_i$ of said second filter means by a first coefficient and a second coefficient, respectively, and then adding these multiplied outputs.

43. An apparatus according to claim 42, further comprising modifying means for modifying said first and second coefficients.

44. An apparatus comprising:
(1) an optical means for forming a first image and a second image of an object;
(2) generating means for generating a series of first electric signals $a_1$, $a_2$, $a_3$. . . and a series of second electric signals $b_1$, $b_2$, $b_3$. . . , each being associated with said first image and said second image, respectively,
(3) weighting/adding filter means for receiving and filtering said first and second electric signals,
said filter means performing weighting/adding operations $$A_i = \sum_{j=1}^{m} a_{i+j} \times W_j \text{ and } B_i = \sum_{j=1}^{m} b_{i+j} \times W_j$$

on said received first and second electric signals, respectively, weighting coefficients $W_1$, $W_2$, ..., $W_m$ being selected in such a way that at least three of weighting coefficients $W_1$, $W_2$, ..., $W_m$ are not zero, and a summation of weighting coefficients $W_1$, $W_2$, ..., $W_m$ is substantially equal to zero; and
(4) producing means for producing, in accordance with said first and second electric signals filtered by said filter means, an output associated with a relative displacement amount between said first and second image.

45. An apparatus according to claim 44, wherein both of said first and second electric signals have a pitch P, number of non-zero weighting coefficients three, the designated by $W_k$, $W_{k+l}$, $W_{k+l+t}$, respectively, k, l and t being natural numbers, $W_k$ and $W_{k+l+t}$ being of the same sign, $W_{k+l}$ being of an opposite sign to $W_k$, l and t for said three weighting coefficients $W_k$, $W_{k+l}$, $W_{k+l+t}$ are determined so as to satisfy l=n and l+t=2n, n being a natural number.

46. An apparatus according to claim 45, wherein n=2, $W_k$ is equal to $W_{k+l+t}$, and an absolute value of $W_k$ is half of that of $W_{k+l}$.

47. An apparatus according to claim 44, wherein said filter means has MTF characteristics in which a spatial frequency f corresponding to a peak of MTF value satisfies $0<f\leq 1/4P$, and the MTF value for a spatial frequency 3/8P is below a half of said peak of MTF value.

48. A focus detection apparatus comprising:
(1) an imaging optical system;
(2) optical means for forming a first image and a second image of an object, a relative displacement between said first and second images varying in accordance with a focusing state of said imaging optical system;
(3) generating means for generating a series of first signals representing an illumination distribution pattern of said first image and a series of second signals representing an illumination distribution pattern of said second image, said first and second signals being image data with respect to a spatial pitch P;
(4) correlating means for receiving said first and second signals and computing a correlation amount between patterns of said first and second signals every time when said first and second signals are relatively shifted to each other by a predetermined amount, said predetermined amount being an integer in a unit of said spatial pitch P;
(5) interpolating means for interpolating from said plural correlation amounts obtained by said correlating means local minimums of said correlation amounts and shift amounts which give said local minimums; and
(6) means for comparing said local minimums with a predetermined value, and, in accordance with said interpolated shift amounts which give said local minimums exceeding said predetermined value, for effecting at least one of driving operation of said imaging optical system to an in-focus position and display operation of said focusing state of said imaging optical system.

49. A focus detection apparatus according to claim 48, wherein said local minimums are normalized so as not to depend on said illumination distribution patterns of said first and second images, and said predetermined value is a constant.

50. A focus detection apparatus according to claim 48, further comprising causing means for causing said interpolating means to interpolate said shift amounts only when said shift amounts give said local minimums exceeding said predetermined value.

51. A detection apparatus for detecting a relative displacement amount between a first pattern and a second pattern to each other which are substantially the same to each other comprising:
(1) generating means for generating a series of first electric signals $A_1, A_2, \ldots, A_N$ representing said first pattern with respect to a spatial pitch P and a series of second electric signals $B_1, B_2, \ldots, B_M$ representing said second pattern with respect to said spatial pitch P;
(2) correlating means for receiving said first and second electric signals and for computing a set of correlation amounts between said first and second patterns C(L−1), C(L) and C(L+1) by $$C(L) = \Sigma |A_i - B_{i+L}|$$

everytime when said first and second electric signals are relatively shifted by predetermined values L−1, L and L+1, and then repeating said computation of said set of correlation amounts with shift number L being varied, said predetermined values being integers in a unit of said spatial pitch P; and
(3) shift amount operation means for computing a shift amount Lm from said set of correlation amounts obtained by said correlating means by $$Lm = L + \frac{0.5}{E}\{C(L-1) - C(L+1)\}$$

E being a greater one of C(L+1)−C(L) and C(L−1)−C(L).

52. A detection apparatus according to claim 51, further comprising:
producing means for producing an extremal output proportional to are extremal Cext obtained from said plural correlation amount by $$C_{ext} = C(L) - 0.5|C(L-1) - C(L+1)|;$$

and discriminating means for discriminating whether said extremal output exceeds a preselected value or not, and then causing said shift amount operation means to compute said shift amount which gives said extremal output exceeding said preselected value.

53. A detection apparatus according to claim 52, wherein
said extremal outputs are formed by normalizing said extremals so as not to depend on types of said first and second patterns, and said preselected value is a constant.

54. A detection apparatus according to claim 53, wherein
said extremal output is equal to said extremal divided by E.

55. A detection apparatus according to claim 51, wherein
said correlating means includes memory means storing at least one of the correlation arounts of said set, and said stored correlation amounts in said memory means are used as at least one of said sets of correlation amounts to be newly computed on varying said shift number L.

56. A detecting apparatus according to claim 52, wherein
said correlating means computes said set of correlation amounts C(L−1), C(L) and C(L+1) for L=O, and then computes said sets of correlation amounts when said shift number L is varied successively as $L = \pm 1, \pm 2, \ldots,$
said producing means produces said extremal outputs in accordance with said sets of correlation amounts C(L−1), C(L) and C(L+1) transferred from said correlation means, and said discriminating means causes computing operations by said correlation means to terminate on detecting that said extremal output exceeds said preselected value.

57. A focus detection apparatus for detecting a focusing state of an imaging optical system comprising:
(1) optical means for forming a first image and a second image of an object with light passing through said imaging optical system, relative displacement between said first and second images varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) filter means for filtering said first and second electric signals, said filter means having MTF characteristics suppressing a spatial DC component;
(4) displacement amount detecting means for detecting a first relative displacement amount between said first and second images in accordance with said first and second electric signals filtered by said filter means, and for detecting a second relative displacement amount between said first and second images in accordance with said first and second electric signals not filtered by said filter means;
(5) selecting means for selecting a first or a second mode, in said first mode said displacement amount detecting means detecting said first relative displacement amount in accordance with said first and second electric signals filtered by said filter means, in said second mode said displacement amount detecting means detecting said second relative displacement amount in accordance with said first and second electric signals not filtered by said filter means, said selecting means selecting said second mode from said first mode when in said first mode said displacement amount detecting means is unable to detect said first relative displacement amount.

58. A focus detection apparatus for detecting a focusing state of an imaging optical system comprising:
(1) optical means for forming a first image and a second image of an object with light passing through said imaging optical system, relative displacement between said first and second images varying in response to said focusing state of said imaging optical system;
(2) generating means for generating a series of first electric signals and a series of second electric signals each of which represents an illumination distribution pattern of said first image and an illumination distribution pattern of said second image, respectively, said first and second electric signals being image data with respect to a spatial pitch P;
(3) filter means for filtering said first and second electric signals, said filter means having MTF characteristics suppressing a spatial DC component;
(4) producing means for producing a first focus detection signal representing said focusing state in accordance with said first and second electric signals filtered by said filter means, and for producing a second focus detection signal in accordance with said first and second electric signals not filtered by said filter means;
(5) causing means for causing said producing means to produce said first focus detection signal in accordance with said first and second electric signals filtered by said filter means, and for causing said producing means to produce said second focus detection signal in accordance with said first and second electric signals not filtered by said filter means when said producing means is unable to produce said first focus detection signal.

* * * * *